United States Patent
Tanaka

(10) Patent No.: US 7,328,958 B2
(45) Date of Patent: Feb. 12, 2008

(54) ERROR INFORMATION ACQUIRING METHOD AND PRINT CONTROLLING METHOD

(75) Inventor: Kentaro Tanaka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 273 days.

(21) Appl. No.: 11/281,391

(22) Filed: Nov. 18, 2005

(65) Prior Publication Data

US 2006/0126139 A1 Jun. 15, 2006

(30) Foreign Application Priority Data

Nov. 18, 2004 (JP) ............................. 2004-335068
Nov. 30, 2004 (JP) ............................. 2004-346838

(51) Int. Cl.
*B41J 2/205* (2006.01)
(52) U.S. Cl. ............................. 347/15; 347/14; 347/19
(58) Field of Classification Search .................. 347/14, 347/15, 19, 41–43; 358/518; 399/301
See application file for complete search history.

(56) References Cited

U.S. PATENT DOCUMENTS 5,550,625 A * 8/1996 Takamatsu et al. .......... 399/301
RE38,180 E * 7/2003 Edge ............................ 347/19
6,755,498 B2 * 6/2004 Revie et al. .................. 347/15

FOREIGN PATENT DOCUMENTS

JP 10-278360 A 10/1998

* cited by examiner

*Primary Examiner*—Lam Son Nguyen
(74) *Attorney, Agent, or Firm*—Sughrue Mion, PLLC

(57) ABSTRACT

When it has become necessary to reset color adjusting ID for the printer 20 because of the replacement of component parts or other causes, even in an environment where the printing condition that had been adopted for setting the ID in the past cannot be recreated, it is easy to calculate the ID of the equivalent value as those that would have been calculated if the printing condition that had been adopted for setting the ID in the past can be made available by using the color component conversion function. As a result, it will be no longer necessary to maintain materials and equipment in a good and unified state in the production site of products or at places where after-sales services are rendered.

23 Claims, 19 Drawing Sheets

FIG.7

Representative ink selected color component density S0 for the reference printer

| C | M | Y | K | MK |
|---|---|---|---|---|
| 50.0 | 55.0 | 55.0 | 40.0 | 45.0 |
| (L) | (L) | (L) | (L) | (L) |

Representative ink selected color component density S1 for the object printer

| C | M | Y | K | MK |
|---|---|---|---|---|
| 52.5 | 54.5 | 50.0 | 43.0 | 45.5 |
| (L) | (L) | (L) | (L) | (L) |

Compare / $2 \times (S1-S0)$

| C | M | Y | K | MK |
|---|---|---|---|---|
| 5 | −1 | −10 | 6 | 1 |
| (L) | (L) | (L) | (L) | (L) |

For each type of printing head and dot

ID

| Condition | C | M | Y | K | MK |
|---|---|---|---|---|---|
| Small dot 1 | 5 | −1 | −10 | 6 | 1 |
| Medium dot 1 | 7 | −9 | 10 | 2 | 2 |
| Large dot 1 | 2 | 2 | 0 | −5 | −1 |
| Small dot 2 | −6 | 3 | 2 | 9 | −3 |
| Medium dot 2 | −2 | 9 | 3 | 14 | 5 |
| Large dot 2 | −1 | −15 | −10 | −2 | 0 |
| Small dot 3 | 0 | −6 | −8 | −3 | −1 |
| Medium dot 3 | 5 | −2 | 4 | 6 | 3 |
| Large dot 3 | 3 | −1 | 2 | 8 | 5 |

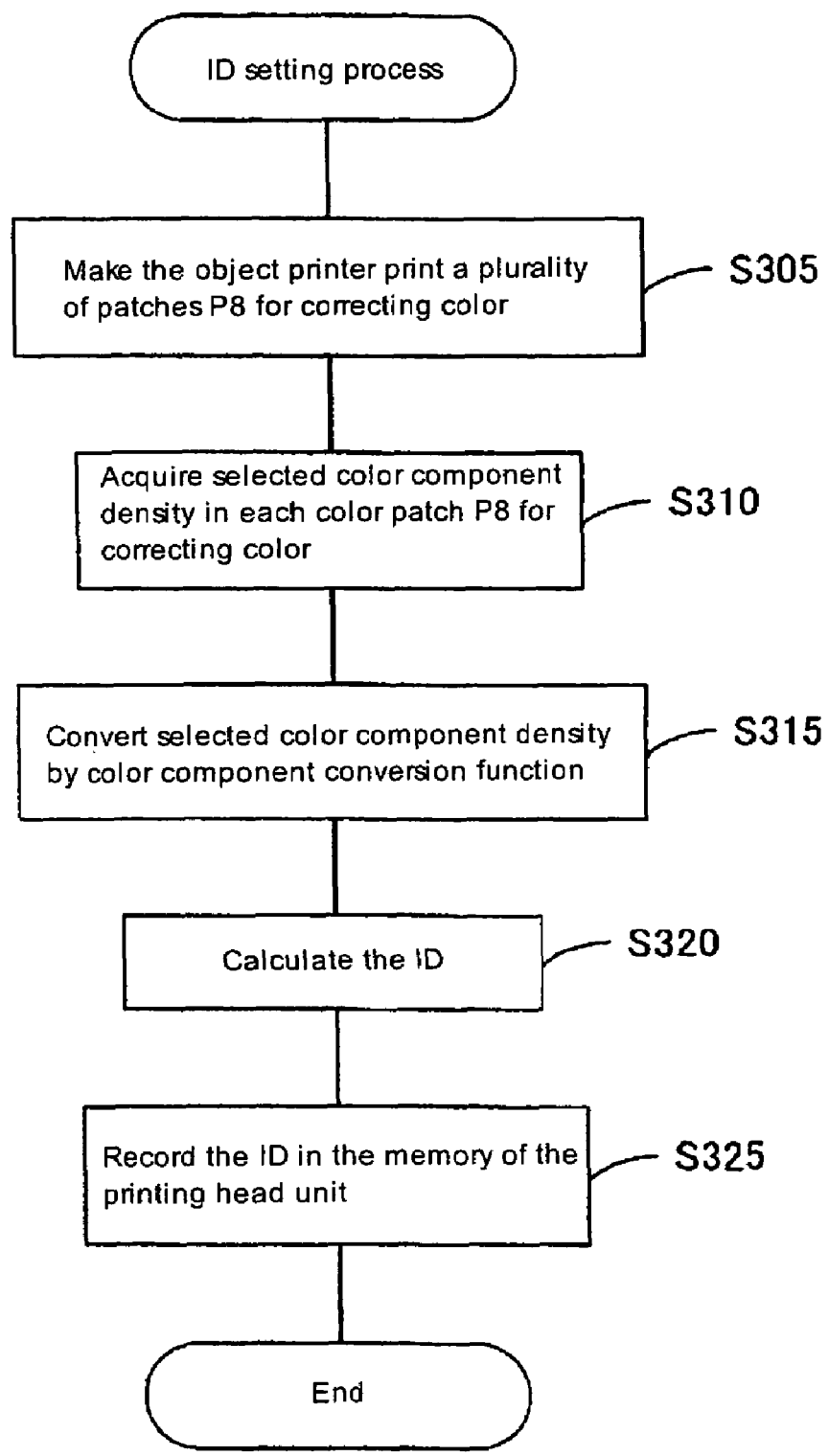

FIG. 12

Standard recording ratio table T1

(In case of Y setting mode 1)

Dot ink density

Small ←——————————→ Large

| Type of dot | Small dot 1 | Medium dot 1 | Large dot 1 |
|---|---|---|---|
| Standard dot recording ratio | 90% | 50% | 30% |

Large ←——————————→ Small

Dot recording ratio

An example of color correcting data

FIG. 19

Dot distribution table 14d

| Input color gradation value | Output color gradation value | | | | | | | | |
|---|---|---|---|---|---|---|---|---|---|
| | S 1 | M 1 | L 1 | S 2 | M 2 | L 2 | S 3 | M 3 | L 3 |
| 0<br>⋮<br>255 | 0<br>⋮<br>Ai<br>⋮<br>0 | 0<br>⋮<br>0 | 0<br>⋮<br>255 | 0<br>⋮<br>0 | 0<br>⋮<br>0 | 0<br>⋮<br>255 | 0<br>⋮<br>0 | 0<br>⋮<br>0 | 0<br>⋮<br>255 |

D11     D12     D13

⇩

After the correction

| Input color gradation value | Output color gradation value | | | | | | | | |
|---|---|---|---|---|---|---|---|---|---|
| | S 1 | M 1 | L 1 | S 2 | M 2 | L 2 | S 3 | M 3 | L 3 |
| 0<br>⋮<br>255 | 0<br>⋮<br>ACi<br>⋮<br>0 | 0<br>⋮<br>0 | 0<br>⋮<br>⋮ | 0<br>⋮<br>0 | 0<br>⋮<br>0 | 0<br>⋮<br>⋮ | 0<br>⋮<br>0 | 0<br>⋮<br>0 | 0<br>⋮<br>⋮ |

S=Small, M=Medium, L=Large

ERROR INFORMATION ACQUIRING METHOD AND PRINT CONTROLLING METHOD

BACKGROUND OF THE INVENTION

1. Field of the Invention

The present invention relates to an error information acquiring method, an error information acquiring program product, an error information acquiring device, a print controlling method, a print controlling program product and a print controlling device for acquiring information for compensating color drifts in any printing devices for printing images corresponding to printing data by means of printing heads.

2. Description of the Prior Art

Each of the ink jet printers that have been mass-produced in the past has an array of printing nozzles for each color (type) of ink and a nonvolatile semiconductor memory containing an ID (error information) for compensating drifts in the weight of ink discharged from each array of printing nozzles. For controlling the printing of each printer, color correcting data such as a LUT (look up table) for calibration corresponding to the ID are prepared in advance and are stored, and errors in the weight of ink are compensated so that the weight of ink discharged from the printing head may agree with that of the reference printer (reference equipment) by referring the color correcting data corresponding to the ID. (For example, see Japanese Patent Application Laid Open 1998-278360).

And the applicant has already filed an application (Japanese Patent Application 2004-35947) relating to the invention of a print controlling device for correcting variations in color reproducibility that appear between various printers and the reference equipment by using the ID indicating the result of comparison between the measured color data of patch images printed by a printer due to be mass-produced based on the specified printing data and the reference measured color data.

In addition, the applicant has already filed an application (Japanese Patent Application 2004-20989) relating to the invention of a print controlling device for correcting variations in color reproducibility that appear in various printer by having the patch images printed by the printer due to be mass-produced each printing head being filled with a different alternative ink from the ink that should be normally used therein, by acquiring an ID indicating the result of comparison between the converted value of the measured color data of the patch images and the reference measured color data and by using the acquired ID.

Although each of the prior applications mentioned above is useful for setting the ID for each printer for example when the printer is mass-produced, there is no assurance that the ID setting will continue to be used in each printer. And it will be necessary to reset the ID, for example, when the printing head or various components constituting the printing head is or are replaced. Here, the ID that had already been set was chosen by comparing the result of measuring the colors of the patch images printed under the specified conditions among various printing conditions that vary depending on the type of ink or the type of printing medium used and the specified reference data. Therefore, even in the case of acquiring the ID again, it is necessary to print the patch images essentially under the same printing conditions as the ones under which the ID had been set in the past and to measure their color.

However, in the case of resetting the ID, it is in reality difficult in view of differences in facilities and the acquisition of materials and cost to obtain always the same printing conditions for printing patch images as in the previous case of setting the ID for the mass production of printers. Therefore, even when it has become necessary to reset the ID, sometimes it was not possible to acquire the correct ID for compensating variations in color reproducibility that appears in various printers.

And when the ID is to be reset again, it is difficult for certain types of ink to adhere on the printing medium depending on the combination of the printing medium and the ink made available for printing the patch images and as a result patch images sometimes cannot be printed. In such a case, it will be more difficult to obtain a correct ID.

SUMMARY OF THE INVENTION

The present invention was made in view of the issues described above, and its object is to provide an error information acquiring method, an error information acquiring program product, an error information acquiring device, a print controlling method, a print controlling program product and a print controlling device capable of acquiring precisely error information and of realizing a good color reproducibility in printed images even when there are errors in the printing environment at the time of setting error information for compensating color drifts in the printing device.

In order to achieve the object described above, the error information acquiring method according to an embodiment of the present invention acquires error information representing color drifts of a printing device having a plurality of printing heads corresponding to a plurality of ink types and capable of printing images corresponding to printing data by making ink adhere on the printing medium. The error information basically consists of the result of comparing the first measured color data acquired by measuring in the specified color space the colors of patch images printed by the printing device with the standard ink recording density under the first printing condition by discharging ink on the printing medium with the reference measured color data. On such premise, in the present invention, the second measured color data are acquired by measuring in the specified color space the colors of the patch images printed by the printing device in the standard ink recording density under the second printing conditions different from the first printing conditions. Then, the second measured color data acquired as described above are transformed into estimated measured color data estimated to be acquired by measuring in the specified color space the colors of the patch images printed by the printing device in the standard ink recording density under the first printing conditions. And the error information is acquired by comparing the estimated measured color data with the reference measured color data.

To be more specific, for acquiring error information, even in the case where it is impossible to make the printing device print the patch images under the first printing conditions as in the case of the past setting of error information because of differences in facilities or due to restrictions in respect of material procurement and cost, the second measured color data which are the result of color measurement of the patch images printed according to the second printing conditions are converted by taking into account differences in both printing conditions. Thus, estimated measured color data are acquired and consequently error information is acquired. As a result, if the patch images are printed by the printing device according to the first printing conditions at that time, it is possible to acquire the same error information as the one which would have been acquired by comparing the result of color measurement of the patch images with the reference measured color data.

Thus, according to the embodiment of the present invention, it is possible acquire precise error information by using the result of color measurement even when it is necessary to print patch images according to printing conditions different from the printing conditions primarily required to acquire error information.

As another feature of the present invention, the second measured color data may be converted into the estimated measured color data by using a specified function. More specifically, the patch images are printed by the specified printing device in the standard ink recording density according to the first printing conditions while the ink density of the dots discharged from the printing head remains changed to the specified extent from the specified standard amount, and the relationship of correspondence is obtained between the measured color data of the same color components as the first measured color data obtained by measuring the colors of these patch images and the measured color data of the same color components as the second measured color data obtained by having a specified printing device print patch images in the standard ink recording density according to the second printing conditions while the ink density of dots discharged from the printing head remains changed to the specified extent from the reference amount indicated above, and this relationship of correspondence is taken into account for determining in advance the function for using the second measured color data as an input value.

When the second measured color data are converted by using such a function, it will be easy to calculate estimated measured color data of nearly the same value as the first measured color data assumed to have been obtained if the patch images were printed according to the first printing condition by the printing device on which error information is to be set, and as a result precise error information can be acquired. Incidentally, the linear function or higher-order function for the conversion may be determined by changing the ink density of dots discharged by the printing head in the process described above by a plurality of stages from the specified reference amount, and by acquiring a plurality of sets of correspondence relationship between the measured color data of the same color components as the first measured color data and the measured color data of the same color components as the second measured color data.

As described above, error information is basically indicated by comparing the first measured color data obtained by measuring the color in a specified color space of the patch images printed by the printing device in the standard amount of ink according to the first printing conditions with the reference measured color data. In the present application, the printing device prints patch images in the standard amount of recording ink according to the second printing conditions different from the first printing conditions. This is because the error information can be obtained by measuring the color of the second printed patch image in the specified color space to obtain the second measured color data, by converting the second measured color data into the specified converted value corresponding to their values, and by comparing the converted value with the reference measured color data.

However, depending on the details of the second printing condition adopted, there can be types of ink that do not adhere on the printing medium used for printing patch images, and no patch images can be printed by such types of ink, and as a result no error information can be obtained.

As a result, in the case of having patch images printed according to the second printing conditions in the standard amount of recording ink, the invention of another method of acquiring error information related to the present application acquires the printing head variation data indicating the extent of variation of the amount of ink discharged relating to the printing head corresponding to the type of ink, if there is any type of ink that do not adhere on the printing medium. Then, estimated measured color data estimated to be obtained by measuring in the specified color space the color of the patch images printed by a printing head corresponding to the non-adhering type of ink according to the first printing conditions in the standard ink recording density are sought based on the printing head variation data corresponding to the non-adhering type of ink. And the error information is obtained by comparing the estimated measured color data acquired and the reference measured color data.

The implementation of the procedure described above enables to obtain the error information in the printing head corresponding to the non-adhering ink without actually printing any patch image for the type of ink not adhering on the printing medium adopted for printing the patch image according to the second printing condition.

Thus, the embodiment of the present invention enables to obtain precise error information even in the case where it is necessary to print patch images according to a printing condition different from the printing condition essentially necessary for obtaining the error information or in the case where it is even impracticable to print the patch image.

As another structure of the present invention, the printing device may have printing head variation data relating to each printing head by a form of information readable by the specified image reading device. As a result, the printing device can have the image reader read the printing head variation data and input such printing head variation data into the printing heads corresponding to the non-adhering ink type from the image reader. Thus, if each printing device designed to obtain error information has printing head variation data independently for each printing head, the printing head variation data related to the printing head corresponding to the non-adhering ink type can be easily acquired. Incidentally, an example of the form of information of printing head variation data readable by the image reading device may be a seal containing a bar code image including printing head variation data.

As another feature of the present invention, the estimated measured color data based on the printing head variation data of the printing head corresponding to the non-adhering ink type may be calculated by using the specified functions. Specifically, the functions for which the printing head variation data are input values are determined in advance by referring the relationship of correspondence between each measured color data of the same color component as the first measured color data and the printing head variation data related to a plurality of printing heads having the variations. The measured color data is acquired from the result of color measurement in the specified color space of the patch images printed respectively under the first printing conditions in the standard ink recording density by using a plurality of printing heads respectively having the variations in the amount of ink discharged in the prescribed printing device.

If the printing head variation data of the printing heads corresponding to the non-adhering ink type are converted by using the function mentioned above, it will be easy to calculate the estimated measured color data of the same color components as the first measured color data that would have been obtained if the printing heads corresponding to the non-adhering type of ink of the printing device for which the error information is set were used to print the patch images according to the first printing conditions in the standard ink recording density, and as a result it will be possible to acquire precise error information. The function mentioned above may be a linear function or a higher-order function.

As another structure of the present invention, the reference measured color data may be acquired by measuring the color in the specified color space of the patch images printed by the specified standard printing device according to the first printing conditions in the standard ink recording density. Error information that will be an index for compensating with a high precision the color drifts of the printing device mentioned above relative to the reference printing device can be obtained by preparing reference measured data in advance and by determining the error information according to the result of comparing the estimated measured color data mentioned above and the reference measured color data.

Differences in printing conditions may take form of a variety of modes, and one of them is the difference in the ink used to fill the printing head. For this reason, as another feature of the present invention, the first printing condition and the second printing condition may differ in the type of ink used to fill each printing head for printing the patch images. For example, in the first printing condition, all of a plurality of printing heads respectively corresponding to different types of ink may be filled with the same ink to print patch images, while in the second printing condition, each printing head may be respectively filled with a type of ink that should primarily be used to print the patch image. And as a result of such a difference, some types of ink may not adhere on the printing medium used.

Thus, according to the embodiment of the present invention, even the case where a type of ink different from the ink that should be used for printing the patch image subject to the measurement of color for obtaining error information must be used to print the patch image, it is possible to obtain precise error information by using the result of the color measurement. And with respect to some inks for which no patch images can be printed, it is possible to obtain precise error information by using the printing head variation data mentioned above.

And the first printing condition and the second printing condition may differ in the type of printing medium used for the printing of the patch images. There are a variety of printing media including ordinary paper, glossy paper and the like, and the difference in the printing medium results in different values in the result of color measurement even if other printing conditions are the same. However, the same type of printing medium may not always be available at the time of setting error information. If the feature of the present invention is adopted, it will be possible to obtain precise error information by using the result of color measurement even in the case where the patch image must be printed on a type of printing medium different from the printing medium that should primarily be used for printing the patch image in order to obtain error information. And it will be possible to acquire precise error information by using the printing head variation data even in the case where no patch image can be printed for some inks.

The technological philosophy relating to the error information acquisition method described above can be grasped as the invention of an error information acquisition program for controlling a computer to execute the process, and has the same action and effect as the error information acquisition method described above. Similarly it is possible to make the structure of the method described above correspond to the error information acquisition device, and such an error information acquisition device has the same action and effect as the error information acquisition method described above.

Here, it is possible to grasp the present invention as a print controlling method for printing by correcting the color of printing data expressing any freely chosen image by using the system of acquiring the error information mentioned above. In other words, a print controlling method for controlling the printing of a printing device having a plurality of printing heads corresponding to a plurality of ink types and capable of printing images corresponding to the printing data by making ink adhere on the printing medium, wherein, in addition to various steps of the error information acquisition method described above, color correcting data for compensating drifts in the amount of ink in the printing device corresponding to the value of error information acquired are determined, the printing data expressing images are corrected to be the printing data for compensating color drifts of the printing image printed by the printing device mentioned above by using the color correcting data mentioned above, and the printing device is controlled to print the printing images corresponding to the corrected printing data.

In the process described above, the color correcting data for compensating the drifts in the amount of ink in the printing device mentioned above according to the value of the error information mentioned above. And printing data expressing images are corrected to become printing data for compensating color drifts in the printing image printed by the printing device by using the color correcting data mentioned above, and the printing device is controlled to print the printing image corresponding to the corrected printing data. As a result, it is possible to improve the color reproducibility of the printed image outputted by the printing device relative to the reference colors. Similarly, it is possible to grasp the technological philosophy related to the print controlling method respectively as the invention of a program and a device for realizing this. And the invention of such a print controlling program and print controlling device have respectively an action and effect similar to those of the print controlling method mentioned above.

BRIEF DESCRIPTION OF THE DRAWINGS

Embodiments of the present invention will be described in detail based on the following figures, wherein:

FIG. 7 is a schematic illustration showing the way color adjusting IDs are decided;

FIG. 8 is a flow chart showing the process of setting ID at the time of after-sales service;

FIG. 12 is a table showing schematically the features of a standard recording ratio table;

FIG. 19 is an illustration showing schematically the features of a dot distribution table.

DESCRIPTION OF THE PREFERRED EMBODIMENTS

We will describe the embodiments of the present invention in the following order.
(1) Schematic configuration for realizing the print controlling method.
(2) Step of setting error information in the production process.
(3) Step of setting error information in the after-sales service 1.
(4) Step of setting error information in the after-sales service 2.
(5) Step of print controlling.

(1) Schematic Configuration for Realizing the Print Controlling Method

Figure 1:
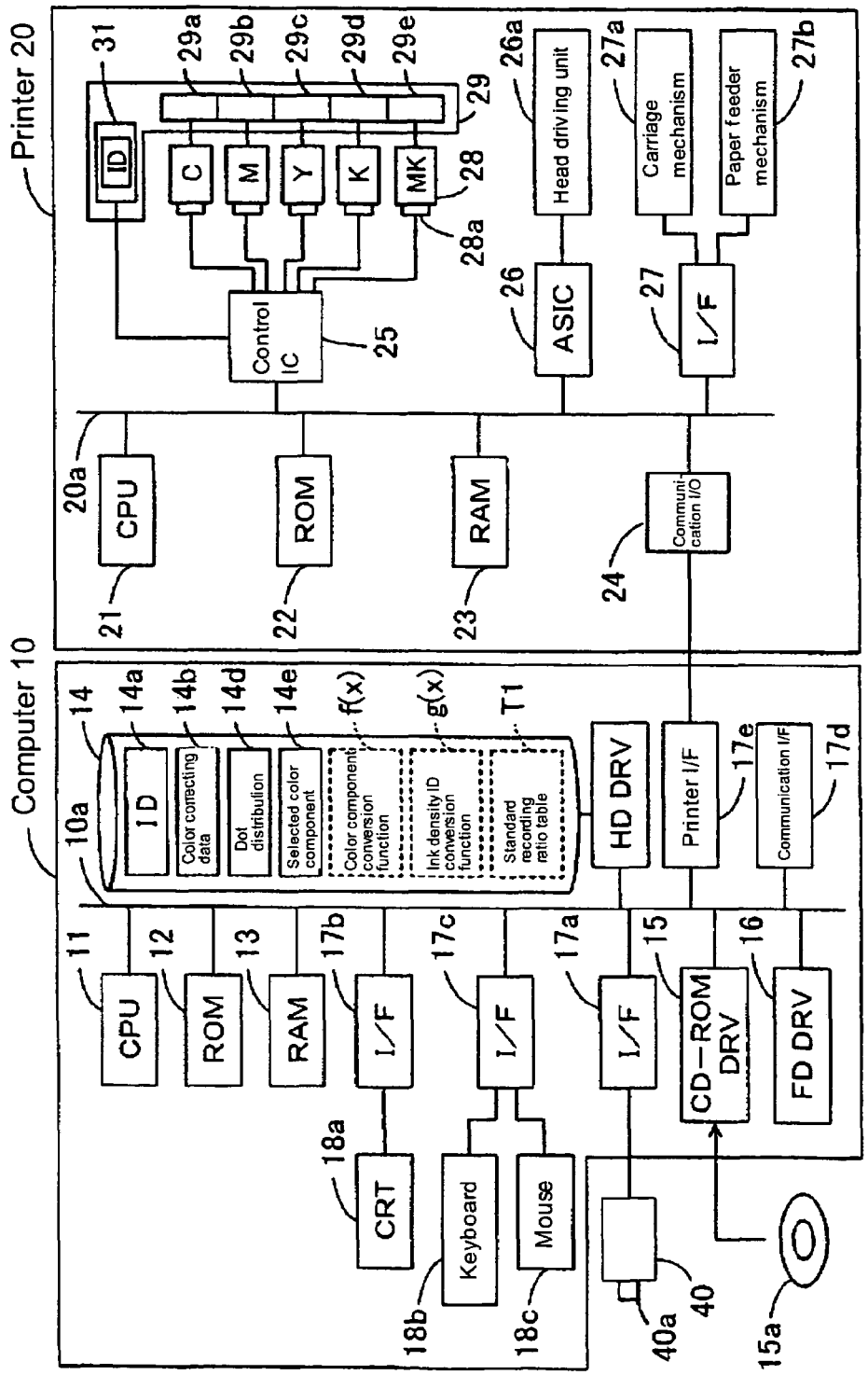
FIG. 1 is a block diagram showing the configuration for realizing a print controlling method and an error information acquisition method.

FIG. 1 shows a computer 10, a printer 20 and the like for executing the print controlling method and the error information acquisition method according to the present invention.

In the computer 10, a CPU 11 constituting the nucleus of computing processing controls the whole computer 10 through a system bus 10a. The bus 10a is connected with a ROM 12 that is a non-rewritable semiconductor memory, a RAM 13 that is a rewritable semiconductor memory, a CD-ROM drive 15, a flexible disk (FD) drive 16, various interfaces (I/F) 17a-17e and the like, and with a hard disk (HD) 14 that is a magnetic disk through a hard disk drive.

The HD 14 stores an operating system (OS), application programs (APL) and the like, which are transmitted from time to time by the CPU 11 to RAM 13 to be executed. In the present embodiment, HD 14 constitutes a specified storage area for storing the error information acquisition program of the present invention, a print controlling program, color adjustment ID 14a acquired from the printer, a plurality of color correcting data 14b constituting a linear LUT, a color conversion LUT, a dot distributing table 14d, a color component conversion function f(x), an ink density ID conversion function g(x), a standard recording ratio table T1 and the like. The I/F 17a (for example, USB I/F) is connected with a calorimeter 40. The calorimeter 40 can acquire a plurality of color components L*, a*, b* based on the color system L*a*b* as specified by the International Commission on Illumination (CIE) as color component density value (color value) by directing a color detecting unit 40a towards the object of color measurement, and can output the color component density values acquired on the computer 10. Here, the color spaces L*u*v* are uniform color spaces not dependent on devices. Of course, the color space to be measured may be the color space L*a*b* specified by the CIE, the color space XYZ specified by the CIE or the color space RGB and the like. We will omit * in the following description.

A CRT I/F 17b is connected with a CRT 18a for displaying images corresponding to the relevant data based on the color image data, and an input I/F 17c is connected with a keyboard 18b or a mouse 18c as operating input equipment, and a printer I/F 17e is connected with a printer 20 through, for example, a serial I/F cable.

The printer 20 is a printer ear-marked to be mass-produced, and prints images for printing corresponding to the printing data by making the ink adhere on the printing paper (printing medium) and forming dots there, by making the printing heads 29a-29e discharge five types of ink contained in five ink cartridges 28 provided basically for each of the colors C, M, Y, K, Mk (cyan, magenta, yellow, black and mat black). It is needless to say that a printer using light cyan, light magenta, light black dark yellow, red, violet, uncolored ink may be adopted, and the number of ink types is not limited. And a variety of printing devices such as bubble-jet printer wherein foam is generated in the ink passageway and ink is discharged thereby, a laser printer wherein a toner ink is used to print images for printing on the printing medium, and the like can be adopted. The ink used by the printing device may be liquid or solid. The printer 20 is connected with the CPU 21, the ROM 22, the RAM 23, the communication I/O 24, the control IC 25, the ASIC 26, the I/F 27 and the like through the bus 20a, and the CPU 21 controls various components according to a program written in the ROM 22.

The carriage reciprocating in the main scanning direction in the carriage mechanism 27a is loaded with various ink cartridges 28, and mounted with a printing head unit (a set of printing heads) 29. The unit 29 has printing heads 29a-29e provided for each type of ink and a nonvolatile semiconductor memory 31. This memory 31 may take the form of an EEPROM and the like and records the color adjusting ID (error information) used for correcting printing data on the side of the computer 10. Each printing head 29a-29e can respectively discharge ink in such a way that the ink may adhere on the printing paper. Each cartridge 28 has a memory chip 28a consisting of, for example, a RAM, and each memory chip 28a is electrically connected with a control IC 25.

The communication I/O 24 is connected with the printer I/F 17e of the computer 10, and the printer 20 receives the raster data for each color transmitted by the computer 10 through the communication I/O 24. The ASIC 26 transmits and receives the specified signals to and from the CPU 21 and outputs the applied voltage data corresponding to the raster data to the head driving unit 26a. The head driving unit 26a generates applied voltage pattern for piezo elements contained in the printing head 29a-29e from the applied voltage data, and makes the printing heads 29a-29e discharge ink of each color by dot. The carriage mechanism 27a and the paper feeder mechanism 27b connected with the I/F 27 makes the printing head unit 29 to perform the main scanning and the auxiliary scanning by feeding successively the printing paper while turning pages from time to time.

Each printing head 29a-29e contains respectively a plurality of ink jet nozzles, and a piezo element is arranged for each of the nozzles.

Figure 2:
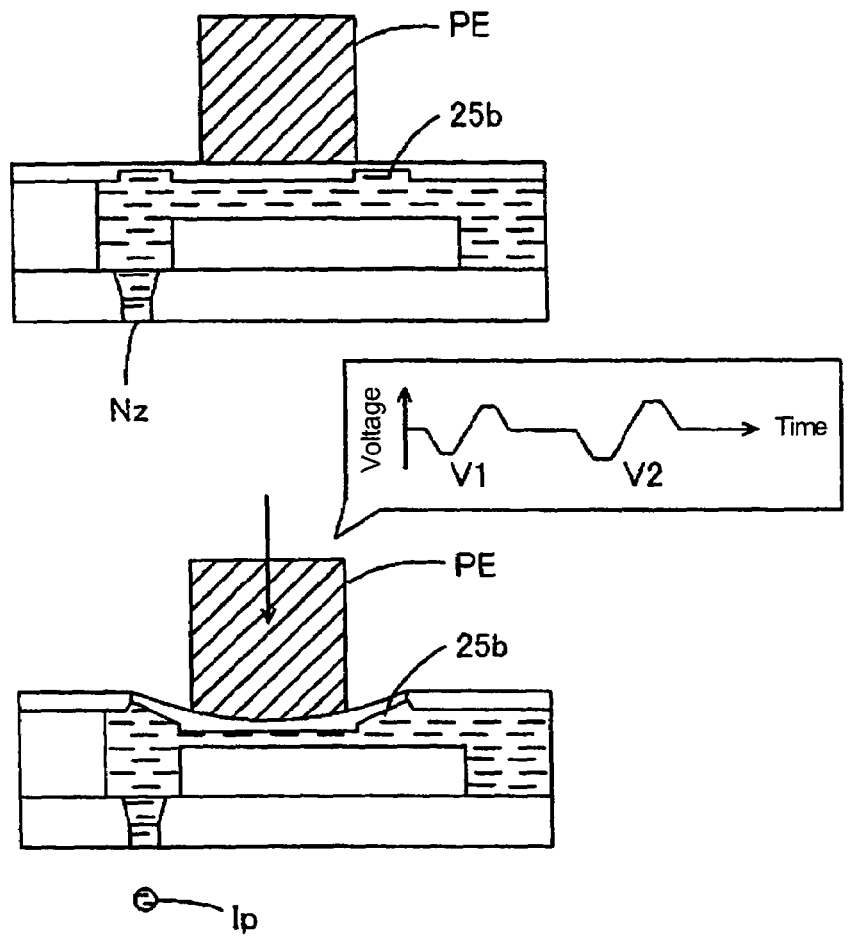
FIG. 2 is an enlarged illustration of the nozzle and its internal structure.

As shown in FIG. 2, the piezo element PE is located in a position adjacent to the ink passageway 25b leading the ink to the nozzle Nz, and when a voltage of a specified period of time is applied between the electrodes fixed on both ends of the piezo element PE, the piezo element swells during the time of application of the voltage and deforms one-side wall of the ink passageway 25b. As a result, the volume of the ink passageway 25b contracts as the piezo element PE swells, and the amount of ink corresponding to this contraction is discharged at a high velocity from the top of the nozzle Nz in the form of an ink drop Ip, and a dot is formed by its infiltration into the printing medium to complete the printing process.

The figure shows a driving waveform for forming a specified number of types of dots of different ink density, and the driving forms V1 and V2 of a specified period of time causes dots of different ink density to form. And since the extent of dilation and contraction of the piezo element grows larger as the difference in voltage of the driving waveform is larger, the dot grows larger. As shown in the tables in the lower half of the figure, roughly speaking, the printer 20 can form three types of dots (large, medium and small) with different ink density (this may be, for example, ink weight or ink volume) on the printing medium, and each of the large, medium and small dots maybe formed on the printing medium furthermore in the form of three types of dots of different ink density. Therefore, the printer 20 discharges an ink drop Ip of a plurality of different stages of ink amount for each color of ink from the same printing head and forms dots of sizes corresponding to the ink amount of the relevant plurality of stages. The raster data transmitted by the computer 10 to the printer 20 contain identification information to identify the type of dot, and the printer 20 forms the type of dot corresponding to the identification information. And when raster data consisting of dot data expressing the type of dot for each raster are inputted, the printer 20 forms a plurality of types of dots with different ink density corresponding to the raster data on the printing medium.

In the computer 10, the OS is provided with a printer driver for controlling the printer I/F 17e to execute various controls. APL exchanges data with the hardware through the OS. The printer driver is put into operation at the time of executing the printing function of the APL, can perform bidirectional communication with the printer 20 through the printer I/F 17e, receives printing data from the APL through the OS, converts the same into raster data and outputs the same to the printer 20.

(2) Setting Processing of Error Information in the Production Process

As for the scene of setting the color adjusting ID (hereinafter the term "ID" refers to the "color adjusting ID") to each printer 20, there can be various scenes including the production process before the shipment of the product printer. Although the present invention displays its feature particularly when an ID is reset after it had been set once in the production process, we will describe in the first place the process of ID setting in the production process that will serve as the premise of everything. Incidentally, the computer 10 and the printer 20 described above are used with their system for resetting the ID after it is set once in the production process. We will, however, explain by taking advantage of the relevant system from time to time in the description of the setting of ID in the production process.

Figure 3:
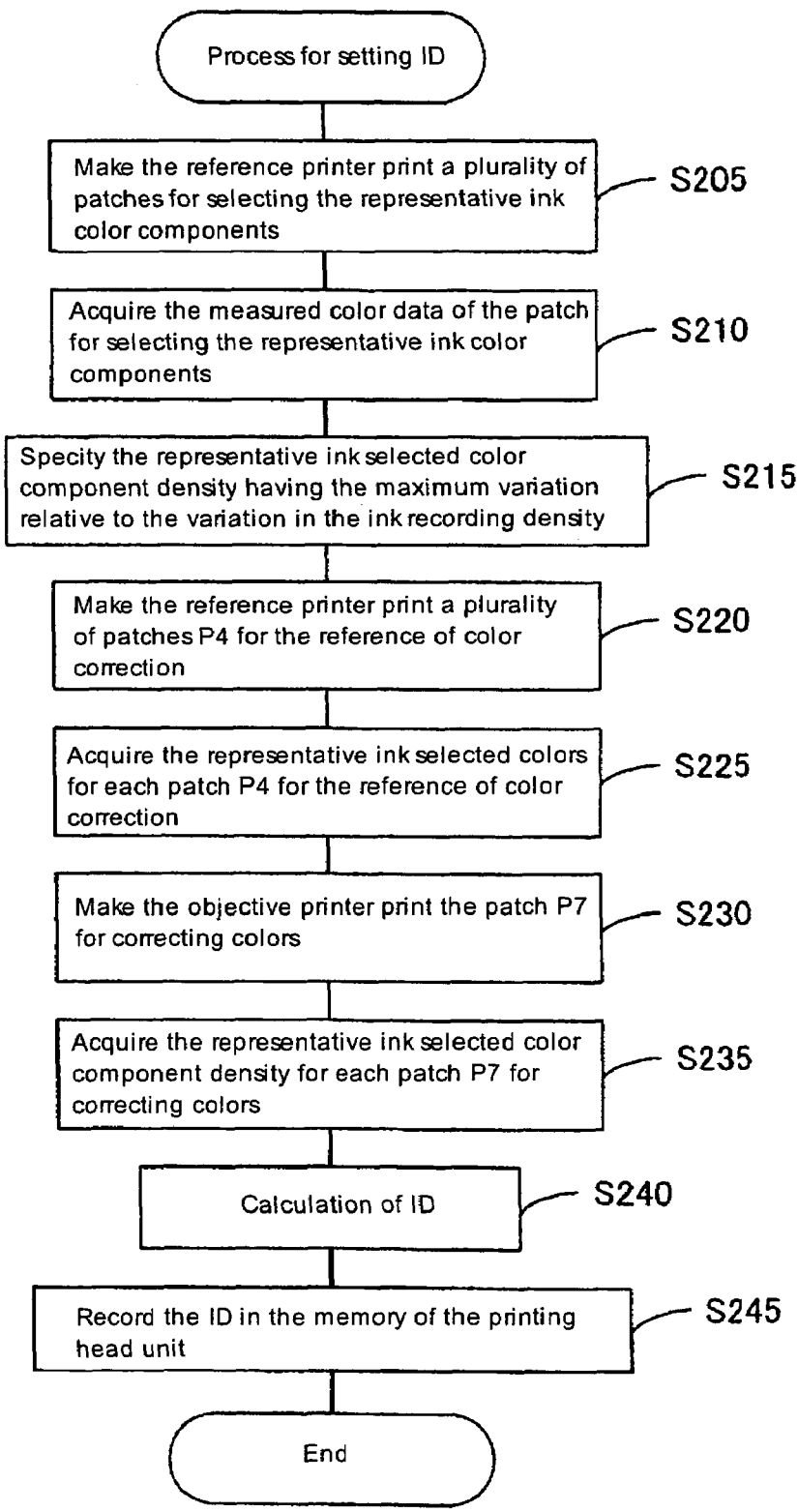
FIG. 3 is a flow chart showing the process of setting ID at the time of production process.
Figure 4:
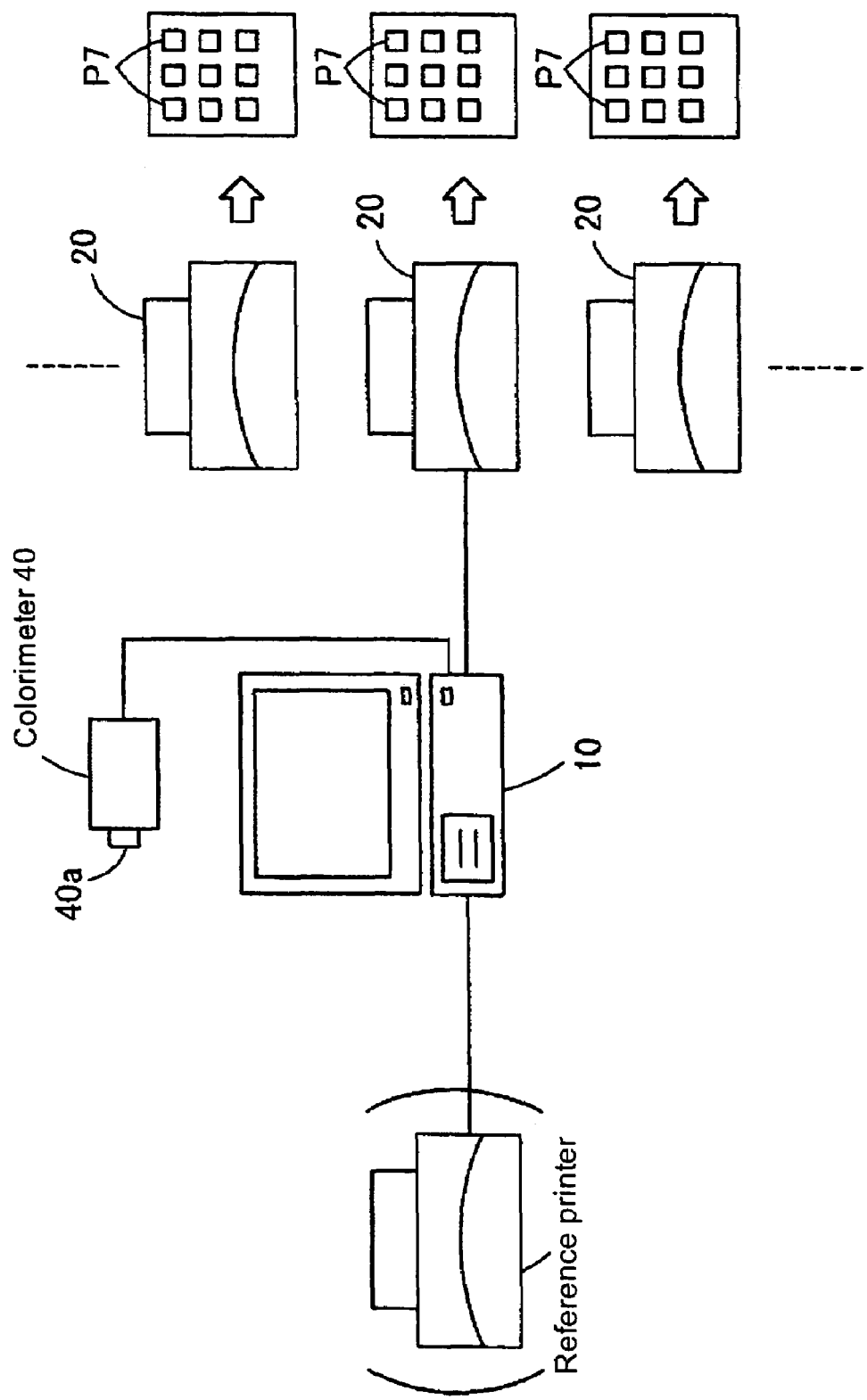
FIG. 4 is a block diagram showing the outline of a system for the setting process of ID.

FIG. 3 is a flowchart showing the process of setting ID executed by the computer in the production process, and FIG. 4 is a block diagram showing the outline of a system suitable for executing the step of setting ID. Incidentally, in the step of setting ID during the production process, all the necessary patch images are printed on the printing paper A among a variety of printing papers including the ordinary paper and the glossy paper.

According to FIG. 4, the computer 10 is connected with a calorimeter 40 and successively with the printers 20 on which the ID will be set (hereinafter referred to as "the object printers"). The object printers 20 are, as described further down below, due to print patches P7 for correcting color by the specified representative inks. And the computer 10 is due to be connected with the reference printer as the reference equipment as required, and the work of setting ID on each object printers 20 will be executed by taking the color of the patch images reproduced on the printing paper A by the reference printer as the reference color. The reference printer shall be the same type as the object printer 20.

In the step S205 (hereinafter the reference to step shall be omitted) of FIG. 3, the computer 10 is made to control the printer to print a plurality of patches P0 for the selection of representative ink color components in which the ink recording density is varied in a plurality of stages by the specified types of dot on the printing medium while the reference printer is connected with the computer 10 and an arrangement is made to have the specified printing head (for example, 29d) discharge a type of representative ink among various ink types. In such a case, the CPU 11 acquires the specified patch image data expressing a plurality of patches and corresponding to a plurality of stages of dot recording ratios that had been stored in the HD 14 in advance and stores them temporarily in the RAM 13. The patch image data are gradated data expressing monochrome plain patches by a large number of picture elements. The CPU 11 controls the reference printer to print a plurality of patches P0 for selecting the representative ink color component corresponding to the patch image data by executing the specified half-tone processing and rasterization processing of the patch image data and by outputting the rasterized data created to the reference printer.

Figure 5:
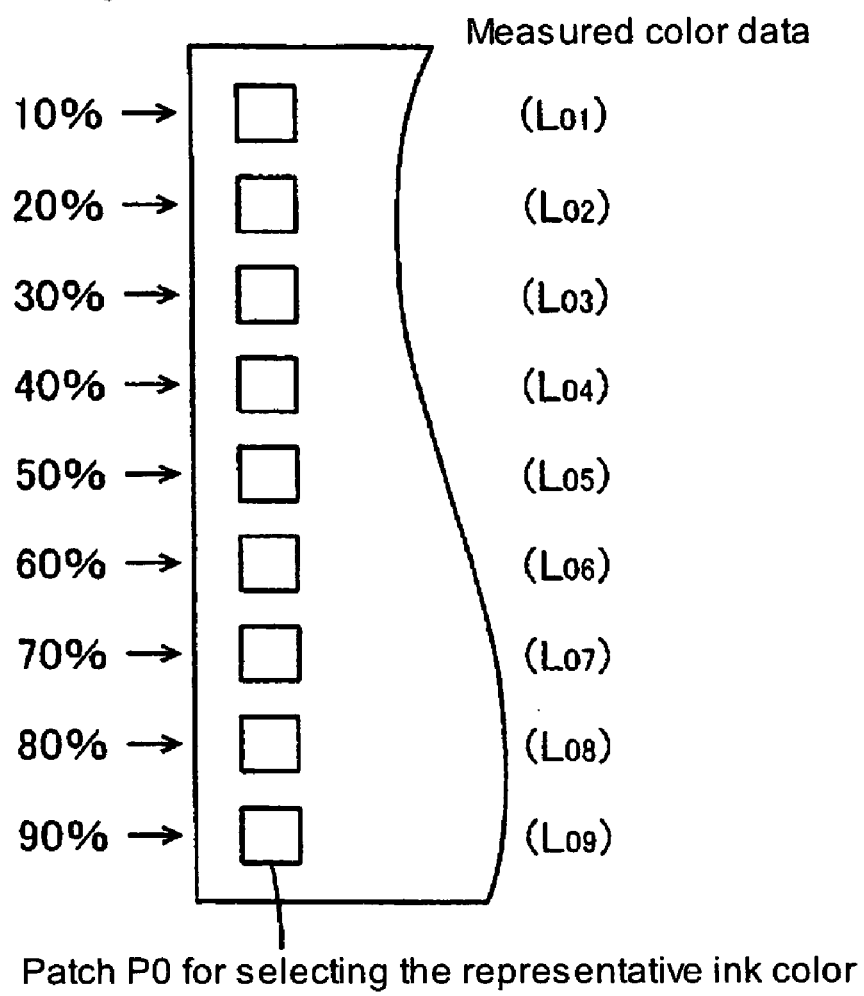
FIG. 5 is a descriptive illustration showing a patch for selecting the representative ink color components.

FIG. 5 shows the case wherein the reference printer prints the patches P0 for selecting the representative ink color components of nine stages from 10% to 90% whose dot recording ratio is gradated by steps of 10% with large dots 1 of the representative ink. The dot recording ratio means the ratio of the number of dots formed relative to the total number of picture elements in the specified area on the printing medium, and is a type of the ink recording density.

In S210, the color of each patch P0 printed as described above is measured by means of a calorimeter 40, and the computer 10 acquires the measured color data of each patch P0.

In S215, the color component density value having the maximum variation relative to the variation of the dot recording ratio from among a plurality of color component density values L, a and b constituting the measured color data is identified as the representative ink selected color component density value based on the measured color data and the dot recording ratio of each patch P0. In the present embodiment, the ink K is used from among five types of ink, CMYKMk as an example of the representative inks. In an image consisting of only the ink K, the color component L varies substantially relative to the variation of the ink recording density, but the color components a and b show almost no change. Consequently, when the representative ink is the ink K, the representative ink selected color component density value shall be L. And the data representing the specified representative ink selected color component density value are stored in the HD 14. Incidentally, the representative ink needs not be necessarily limited to any single color, and the case of not selecting one of the inks corresponding to various printing heads is also possible.

The representative ink selected color component density value thus specified is used as shown below for comparing the result of measuring the colors of the reference printer and the result of measuring the colors of the object printer 20.

In S220, the computer 10 controls the reference printer to print a plurality of patches P4 for the reference of color correction on the printing paper A based on the standard patch image data expressing a plurality of patch images of the standard ink recording density set in advance, while the ink cartridges of the representative ink are mounted so that the representative ink mentioned above may be discharged from all the printing heads of the reference printer.

Figure 6:
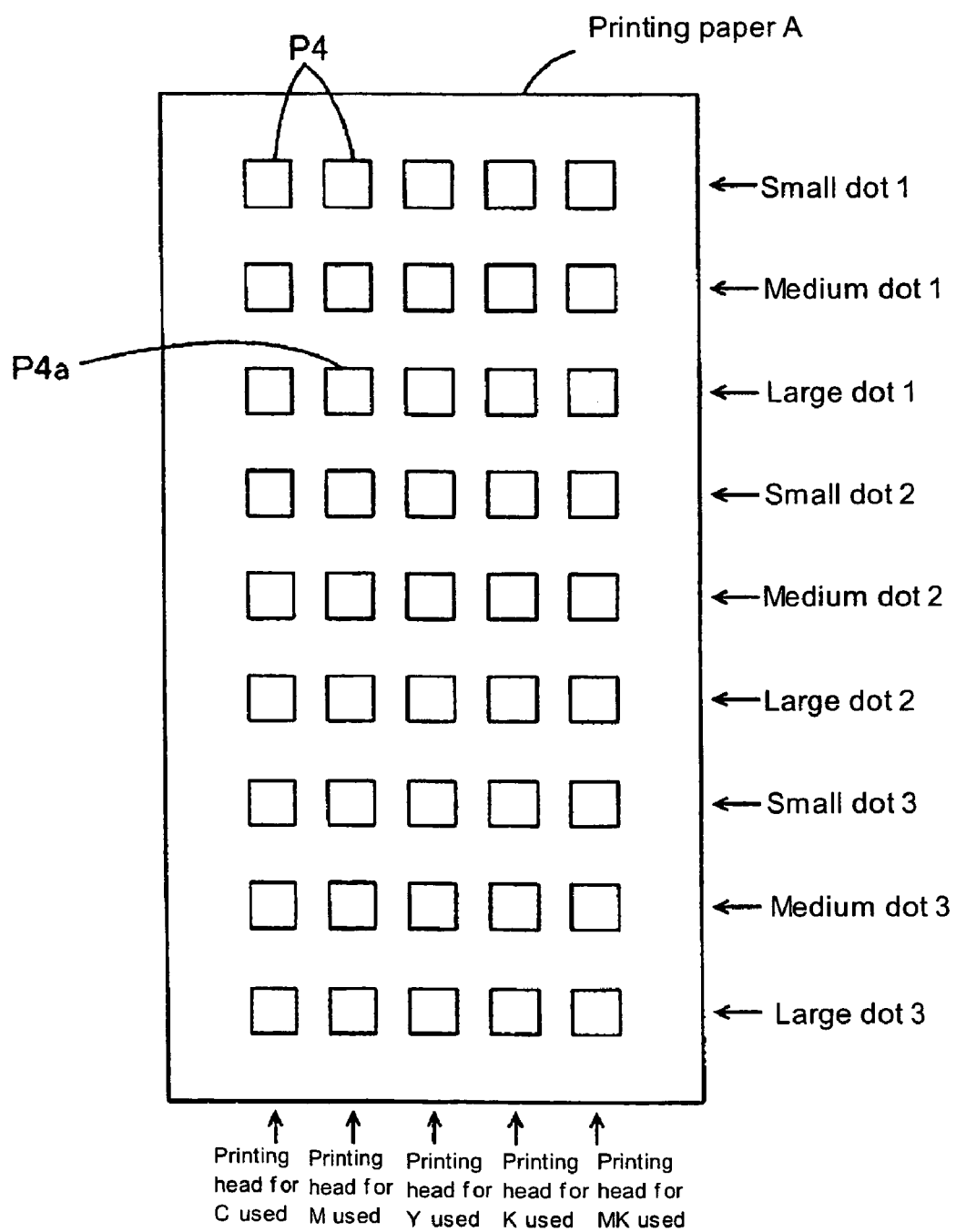
FIG. 6 is a descriptive illustration showing a patch for the reference of color correction.

FIG. 6 shows the case wherein the patches P4 for the reference of color correction are printed on the printing paper A.

All the patches P4 are invariably monochrome of a color K and plain, and are printed for a number of combinations of the printing heads 29a-29e corresponding to each ink CMYKMk and the types of dot. Taking the case of patch P4a shown in the figure as an example, the patch P4a is printed with the ink K discharged from the printing head 29b corresponding primarily to the ink M in the form of large dot 1. The standard ink recording density mentioned above is basically determined for each patch, in other words for each combination of printing head and dot type. The process of determining the standard ink recording density shall be described further below.

In S225, the color of the reference color correcting patches P4 is measured by means of a calorimeter 40, and the representative ink selected color components are acquired from the measured color data of the patches P4. In such a case, the representative ink selected color component density values shall be obtained for the number of combinations of the printing heads 29a-29e and the types of dot. Hereinafter, the representative ink color component density (the reference measure color data) will be called as the reference value as the occasion requires.

The execution of the processes preceding and described in S225 will complete the premise for acquiring the ID of each of the object printers 20 in the production process. To be more specific, the computer 10 execute only the processing leading up to S225, stores the reference value in the HD 14 and the like, and then makes each of the mass-produced printers 20 color correcting patches P7 to have each printer 20 acquire its ID.

In S230, an object printer 20 is connected with the computer 10, and here again an arrangement is made in the same way so that the representative inks mentioned above may be discharged from all the printing heads 29a-29e, and the computer 10 controls the object printer 20 to print a plurality of patches P7 for correcting colors on the printing paper A based on the standard patch image data. In other words, in the same way as the patches P4 shown in FIG. 6, monochrome in the color K and plain patches combining the printing heads 29a-29e corresponding to each ink color and each dot type are printed. Of course, in this case also each patch P7 is printed with the standard ink recording density corresponding respectively individually.

In S235, the color of patches P7 for correcting each color is measured by means of a calorimeter 40, and the representative ink selected color component is acquired from the measured color data of the patches P7 for correcting each color.

In S240, each representative ink selected color component acquired in S235 and each reference value acquired in S225 are compared between the values whose combination between the printing heads and the dot types corresponds to calculate their ID. The ID here can be calculated, for example, by the formula ID=$c \cdot (S1-S0)$, wherein S0 represents the representative ink selected color component density value as the reference value, S1 represents the representative ink selected color component density value resulting from the measurement of color of the patches P7 for correcting colors, and c represents the specified coefficient.

FIG. 7 shows how ID is determined. The upper section of the figure shows the representative ink selected color component density values S0 acquired from the patches P4 for the reference of color correction and the representative ink selected color component density value S1 acquired from the patches P7 for correcting colors, and the result of measuring the color of the patches printed by the types of dot common for each of them (for example, small dot 1). Incidentally, the indication of C, M, Y, K, Mk corresponding to the representative ink selected color component density values S0 and S1 for both patches P4 and P7 shows the type of ink to which the printing head that discharged inks for the patches from which each representative ink selected color component density value primarily corresponds. The selected color component density values S0 and S1 for both patches P4 and P7 are acquired for each combination of printing head and dot type, and the value of ID is calculated by using the formula ID=$c \cdot (S1-S0)$. The middle section of the figure shows the value of the ID for each printing head in the case of small dot 1. The ID shall be calculated for the combinations of all the printing heads 29a-29e corresponding to each ink type and all the dot types. Examples of calculated values of all the ID are shown in the lower section of the figure.

In S245, the ID mentioned above will be stored in the memory 31 of the printing head unit 29 of the printer 20. As a result, the setting process of the ID for each printing head and each dot type corresponding to each ink color on the printer 20 will be completed. The ID created are error information showing the result of comparison of only the representative ink selected color component density value specified as the color component density value having the maximum variation vis-à-vis the variation of ink recording density value from among the color component density value L, a, and b in the color space Lab.

The ID acquired thus during the production process shows the extent of color drift of the printer 20 relative to the reference printer, and the subsequent print controlling process, the printing data may be corrected by compensating the color drift by the color correction data according to the ID value as described further below.

(3) Setting of Error Information in the After-Sales Service 1

The opportunity of setting ID on the printer 20 is not limited to the production process. For example, when various component parts such as the printing head unit 29, the head driver 26a of the printer 20 are replaced or repaired, the ink output features in the printer 20 may vary delicately.

Accordingly, it becomes necessary to find out the extent of color drift with the reference printer mentioned above once more in the post-assembly state. The ID mentioned above are the result of comparing the result of measuring the colors of various patches P7 for correcting colors printed by the printer 20 under the printing condition of using only the representative inks and using the printing paper A for the printing medium and the reference values mentioned above. And the color correcting data selected for compensating color drifts are determined by taking into account the ID values obtained under such conditions.

Therefore, even in the case of resetting the ID afterwards, the color drift in the printer 20 vis-à-vis the reference printer cannot be correctly compensated unless the ID are reset by comparing the result of measuring the color of patches for correcting colors printed under the same printing conditions as described above and the reference values mentioned above. However, in the case of setting ID during the production process and the case of setting ID in the other situations, as a practical matter, it is not always possible to print patches for correcting colors under the same printing conditions as described above in view of differences in facilities, the difficulty in the procurement of materials and reduction of cost. Accordingly, in the present embodiment, even in the case where the printing condition of the patches for correcting colors differ depending on the scene of setting the ID in the printer 20, it has been made possible to acquire the ID expressing correctly the extent of color drifts of the printer 20 relative to the reference printer by compensating such difference. We will explain below, as an example of the scene of setting the ID other than during the production process, by assuming the case of setting the ID for replacing the printing head unit 29 or the head driver 26a at the time of an after-sales service of the product by the company concerned.

FIG. 8 is a flowchart of setting process of ID at the time of the after-sales service executed by the computer 10. In this case also, like FIG. 4, the printers 20 on which the ID are to be set are connected successively with the computer 10 and will be controlled to print the specified patch images or to acquire the ID. And the computer 10 will be connected with a calorimeter 40. Here, in the ID setting process at a time of an after-sales service, the specified patch images will be printed under the printing conditions where a type of printing paper B different from the printing paper A mentioned above will be adopted and the type of ink primarily corresponding to each of the printing heads 29a-29e will be discharged respectively from such printing heads.

Incidentally, depending on the relationship between the printing medium adopted and the type of ink, it may be difficult for the ink to adhere on the printing medium and no printing may be made. However, in the ID setting process shown in FIG. 8, we will explain assuming that each color ink corresponding to each printing head 29a-29e is invariably printable normally on the printing medium B.

To begin with, in S305, the object printer 20 on which the ID will be set is connected with the computer 10, and while the ink cartridges are mounted so that C, M, Y, K, and Ink Mk to which each printing head corresponds maybe discharged from each printing head 29a-29e, the computer 10 controls the object printer 20 to print a plurality of patches P8 for correcting colors on the printing paper based on the standard patch image data expressing a plurality of patch images of the standard ink recording density set in advance.

Figure 9:
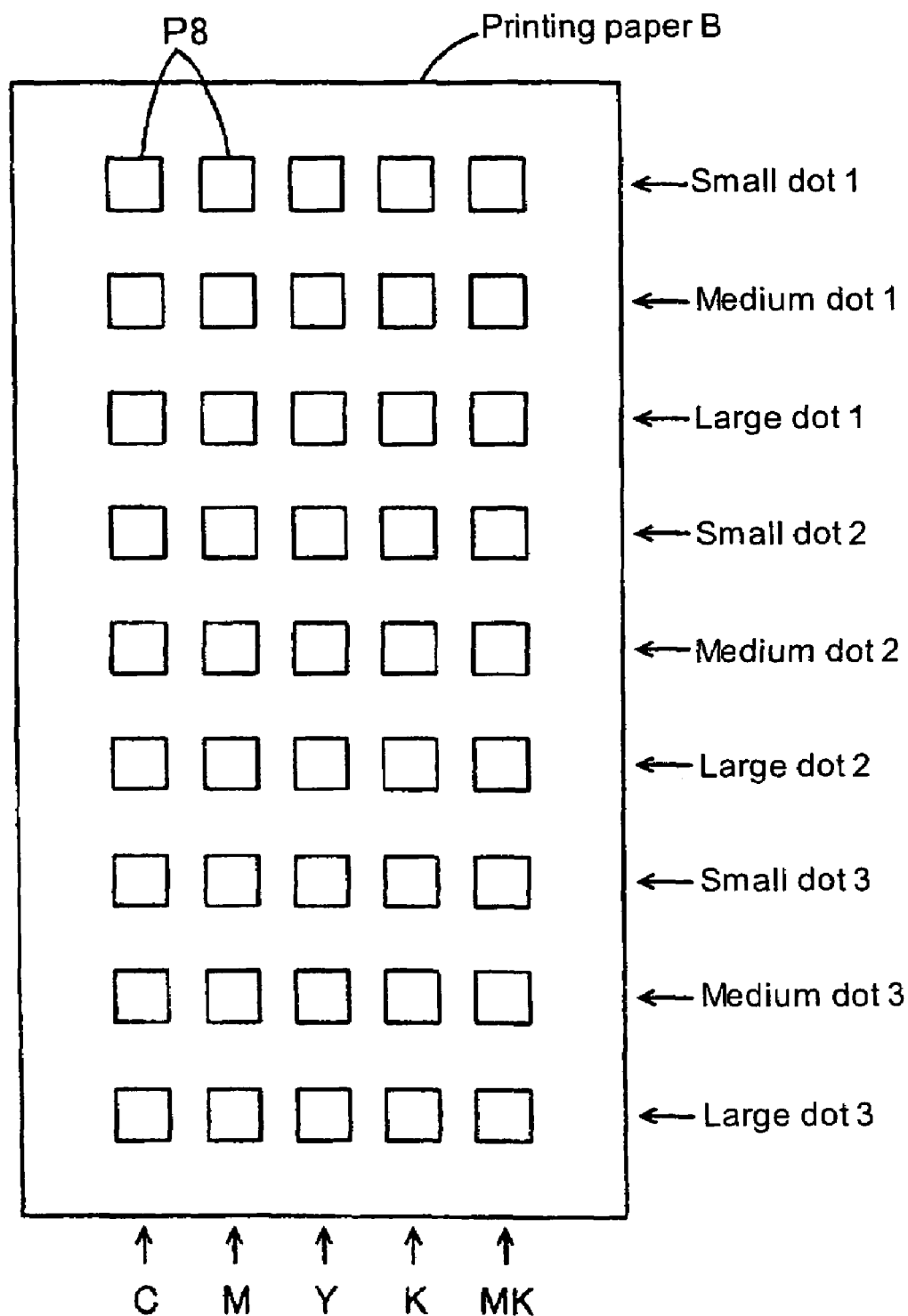
FIG. 9 is a descriptive illustration showing a patch for correcting colors.

As a result, as shown in FIG. 9, patches P8 of each color C, M, Y, K, and Mk corresponding respectively to the combination of each printing head (each ink color) and the dot type will be printed on the printing paper B. In this case also, each patch P8 will be respectively printed in the standard ink recording density corresponding thereto. The standard ink recording density value is the same data as those used for printing the patches P4 and P7 for setting ID during the production process.

In S310, the color of each patch P8 for correcting colors is measured by means of a calorimeter 40, and the selected color component density values are acquired from the measured color data of each patch P8 for correcting colors. In other words, as only the color component density values of the color component density values having the maximum variation vis-à-vis the variation of the dot recording ratio from among the color component density values L, a, and b were acquired as the representative ink selected color component density values when the patches P4 and P7 were printed, in S310 also, only the color component density values having the maximum variation relative to the variation of the dot recording ratio will be acquired from the result of color measurement of each patch P8 for correcting colors as the selected color component density values. Incidentally, the question of which of L, a, and b will be chosen as the selected color component density value will depend on the color of ink.

Here, we will describe in detail on the specification of selected color component density value for each ink color.

Figure 10:
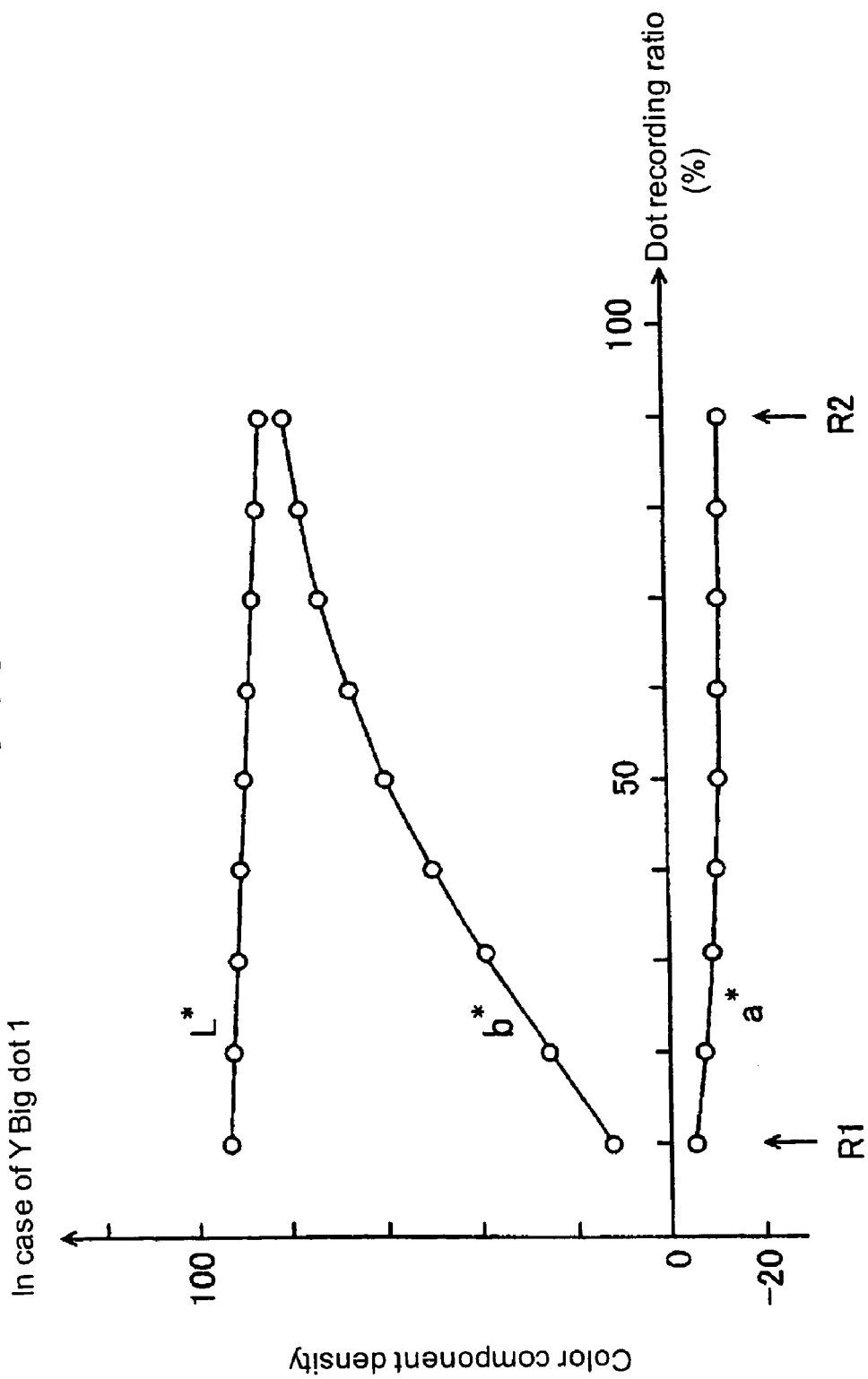
FIG. 10 is a graph showing an example of the result of measuring the color components L, a and b in relation to the dot recording ratio.

FIG. 10 shows an example of result of measuring in the color spaces Lab the color of patches printed on the printing medium according to the recording ratio of each dot of nine stages between 10%-90% differing by stages of 10% like in FIG. 5 for large dot 1 by the ink Y. The horizontal axis represents the dot recording ratio (percentage wise) and the vertical axis represents the amount L, the amount a and the amount b that define the color space Lab. According to the example of the figure, the amount b represents the maximum variation vis-à-vis the variation of the dot recording ratio among the color component density values L, a, and b, and therefore the selected color component density value for the ink Y is determined as the amount b. For example, in the color and the dot type for specifying the selected color component density value, dot recording ratios mutually different will be specified as R1 and R2, the color component density values L, a, and b when the color of a patch with a dot recording ratio of R1 is measured are respectively specified as L1, a1 and b1, and the color component density values L, a, and b when the color of a patch with a dot recording ratio of R2 (assuming that R2>R1) is measured are respectively specified as L2, a2 and b2. When the difference of color component density values for both patches of recording ratios R1 and R2 is calculated by the formulae A L=|L2−L1|, Δa=|a2−a1|, Δb=|b2−b1|, the values of ΔL, Δa and Δb will increase as the difference of the color component density values of the patches with the recording ratios R1 and R2 grows larger. Accordingly, the color component density value corresponding to the maximum calculated value from among ΔL, Δa and Δb may be specified as the selected color component density value. Incidentally, when the minimum dot recording ratio and the maximum dot recording ratio from among varied dot recording ratios are specified respectively as the recording ratio R1 and R2, a good color reproducibility can be obtained for the object printer 20 relative to the reference colors.

Thus, the computer 10 specifies the selected color component density value for each ink color and stores the data 14e representing the selected color component density value specified for each ink color in the HD 14 in advance. As a result, in S310 the selected color component density value corresponding to the color of each patch P8 can be acquired from the measured color data by referring the data 14e when the measured color data of each patch P8 are inputted from the colorimeter 40.

Then, in S315, the selected color component density value for each patch P8 for correcting colors acquired in the step described above is converted into the representative ink estimated selected color component density value by applying the specified color component conversion function f (x).

In other words, as the patches P8 are printed under the printing condition (printing condition 2) wherein each printing head 29a-29e discharges each ink Y, M, C, K, and Mk primarily corresponding thereto and a printing paper B is used as the printing medium, each selected color component density value of such patches P8 and the reference value (representative ink selected color component density value) of the reference patches P4 for correction of colors printed according to the printing condition (printing condition 1) on the printing paper A in the state where the representative ink (ink K) is discharged from all the printing head can in no ways be compared. Therefore, the selected color component density value for every patch P8 for correcting colors is converted according to its value into the representative ink selected color component density value estimated to have been acquired if each patch were printed by the printer 20 under the printing condition 1 at the standard ink recording ratio at the time of an after-sales service by applying a convertible color component conversion function.

We will now describe how to calculate the color component conversion function. Here, a printer 20 for calculating the color component conversion function and a printer PT of the same type are prepared, the printer PT is connected with the specified computer (possibly the computer 10), and the function mentioned above is sought based on the result of color measurement of the patches printed respectively under the printing condition 1 and the printing condition 2.

To begin with, the computer controls the printer PT to print patch images of the standard ink recording density corresponding to the combination of a printing head and a dot type (for example, the combination of the printing head 29c corresponding to the ink Y and large dot 1 discharged thereby) under the printing condition 2, and acquires the selected color component density value b3 from the result of color measurement of the patch image (the print being the patch Y, the selected color component will be the amount b). Then, the computer controls the printer PT to print under the printing condition 1 patch images of the standard ink recording density by the combination of the same printing head and the ink type as those mentioned above, and acquires the representative ink selected color component density value L3 from the color measurement result of the patch images.

Figure 11:
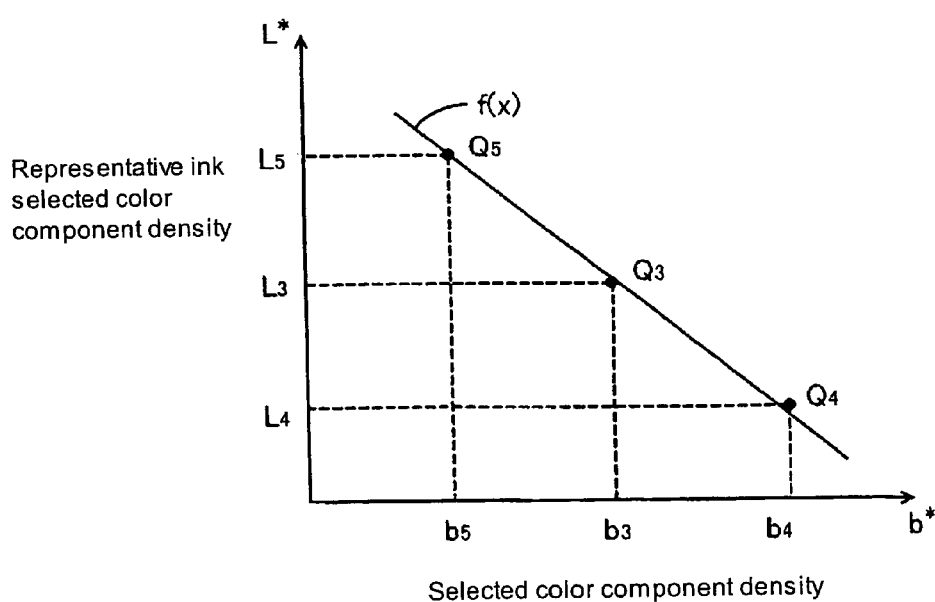
FIG. 11 is a table and graph showing the method of determining the color components conversion function.

The selected color component density value b3 and the representative ink selected color component density value L3 acquired as described above build a conversion relationship as shown in the upper section of FIG. 11.

Then, the computer controls the printer PT to print patch images of the standard ink recording density under the printing condition 2 by making the same printing head 29c as the one mentioned above discharge dots whose ink density per dot is increased from the ones discharged when the above-mentioned b3 and L3 were acquired, and acquires the selected color component density value b4 from the color measurement result of the patch images. In other words, the dot type that existed at the time when b3 and L3 mentioned above were acquired was the large dot 1, and a dot whose ink density per dot is larger by taking the ink density of the large dot 1 as the reference density is adopted for printing the patch Y. In this case, although the patches and the dot recording ratio used for acquiring the above-mentioned b3 are the same, each dot is now larger, and this increases the density of each patch and as a result b4>b3. Incidentally, the ink density per dot can be varied by varying the voltage level of the driving waveform applied to the piezo element.

Then, the printer PT is controlled to print patch images of the standard ink recording density under printing condition 1 by making the same printing head 29c as the one mentioned above discharge dots whose ink density is increased as mentioned above, and acquires the representative ink selected color component density value L4 from the color measurement result of the patch images. At this time, the density of patches rises higher than that existing at the time of acquiring L3, and consequently L4<L3. The selected color component density value b4 and the representative ink selected color component density value L4 build a conversion relationship.

And the computer controls the printer PT to print patch images of the standard ink recording density under the printing condition 2 by making the printing head 29c discharge dots whose ink density per dot is reduced as compared with the dots at the time of acquiring b3 and L3 mentioned above to acquire the selected color component density value b5, and controls the printer PT to print patch images of the standard ink recording density under the printing condition 1 by making the printing head 29c discharge dots whose ink density is reduced as mentioned above to acquire the representative ink selected color component density value L5. In this case, the formulae b5<b3 and L5>L3 will stand.

The lower section of FIG. 11 is a graph wherein (b3, L3), (b4, L4) and (b5, L5) acquired as described above are plotted, and each point is represented respectively by Q3, Q4 and Q5. In the graph, the horizontal axis represents the variation of the selected color component density value resulting from the color measurement of patches printed under the printing condition 2, and the vertical axis represents the variation of the representative ink selected color component density value resulting from the color measurement of patches printed under the printing condition 1. The computer determines a color component conversion function f(x) by taking the points Q3-Q5 as the reference points. Although the function is determined by various methods, in the figure, a linear function passing through the positions where the total sum of distances from each reference point Q3-Q5 is the minimum is calculated, and this is determined as the color component conversion function:

$$f(x)=j\,x+k$$

wherein j is a specified coefficient, k is a specified constant, and the color component density value b is a variable x. And not only a linear function, but also a higher-order function passing through various reference points or a higher-order function in the form of an approximation formula wherein the total sum of distances from each reference point will be the minimum may be calculated, and such a function may be determined as the color component conversion function. And the reference points to be sought need not to be limited to three points but can be constituted by any number of points.

The function f(x) thus obtained can convert the selected color component density value resulting from the color measurement of the patches P8 printed by making the printing head 29c corresponding to the ink Y discharge large dots 1 under the printing condition 2 into the representative ink selected color component density value estimated to have been acquired if the patches were printed alternatively by making the printing head 29c discharge large dots 1 under the printing condition 1. The computer 10 stores the color component conversion function f(x) in the HD 14 in advance, and after acquiring in S310 the selected color component density value, the computer reads in S315 the function f(x) as the occasion demands, inputs the selected color component density value, and calculates the representative ink selected color component density value as a converted value.

In the description above, we described the case of seeking the color component conversion function required for printing the patches P8 for correcting colors by making the printer head 29c corresponding to the ink Y discharge large dots 1 under the printing condition 2 as an example. Such color component conversion functions will be determined in advance according to the procedure similar to the one described above for all the combinations of the printing heads and the dot types, and will be stored in the HD 14.

As a result, the computer 10 can convert the selected color component density value of each patch P8 for correcting colors printed under the printing condition 2 for all the combinations between the printing heads and the dot types into the representative ink selected color component density value by applying the color component conversion function corresponding respectively thereto.

In S320, each representative ink selected color component density value acquired as described above and the reference value mentioned above are compared between the values whose combination between the printing head and the dot type corresponds to calculate the respective ID. In this case also, the ID can be calculated by the formula ID=c (S2−S0) wherein the reference value is represented by S0, the representative ink selected color component density value by S2, and the specified coefficient by c. As a result, the values themselves of the ID calculated may be different. However, it will be possible to acquire once more the ID for all the combinations between the printing heads 29a-29e and the dot types corresponding to each ink type in the same way as shown in the lower section of FIG. 7.

In S325, the ID will be recorded anew in the memory 31 of the printing head unit 29 of the printer 20, and this will complete the regular processing of the ID for the printer 20 at the time of an after-sales service.

Thus, according to the present invention, when it has become necessary to reset the color adjusting ID anew for the printer 20 because of the replacement of parts or other causes, even in a circumstance wherein the printing condition that had been used for setting the ID in the past cannot be adopted, it will be easily possible to calculate an ID of the equivalent value as the one that would have been calculated if the printing condition adopted at the time of setting an ID in the past were available by using the color component conversion function described above. As a result, it will be unnecessary to maintain a uniform environment with respect to materials or equipment at the production site or places for providing after-sales services.

Particularly for setting ID in the production process, the representative ink is often used on all the printing heads taking into account costs. Here, in order to enable the use of the representative ink on all the printing heads, dedicated jigs are necessary for supplying the representative ink to all the printing heads, and at the time of an after-sales service or the like, it is difficult to prepare such dedicated jigs. For this reason, at the time of an after-sales service, the types of ink primarily corresponding to each printing head are often used. According to the present invention, despite such environmental difference, it is possible to compensate such difference to acquire the correct ID.

In the preceding description, we described as an example the case wherein the printing paper and the type of ink used at the time of setting ID are different from those used at the previous time of setting. However, the present invention is obviously applicable when only the type of ink is different or only the printing paper is different. In such a case, it is enough to prepare in advance a color component conversion function capable of realizing a color component conversion that would compensate differences in the result of color measurement of patches for correcting colors resulting from differences in the printing conditions such as disunity in the type of ink or printing paper.

Here, the standard ink recording density described above may be determined as follows.

FIG. 12 shows the standard recording ratio table T1. In the standard recording ratio table T1, the larger the amount of ink gets for the dot type, the lower the standard ink recording density (dot recording ratio) is reduced.

Figure 13:
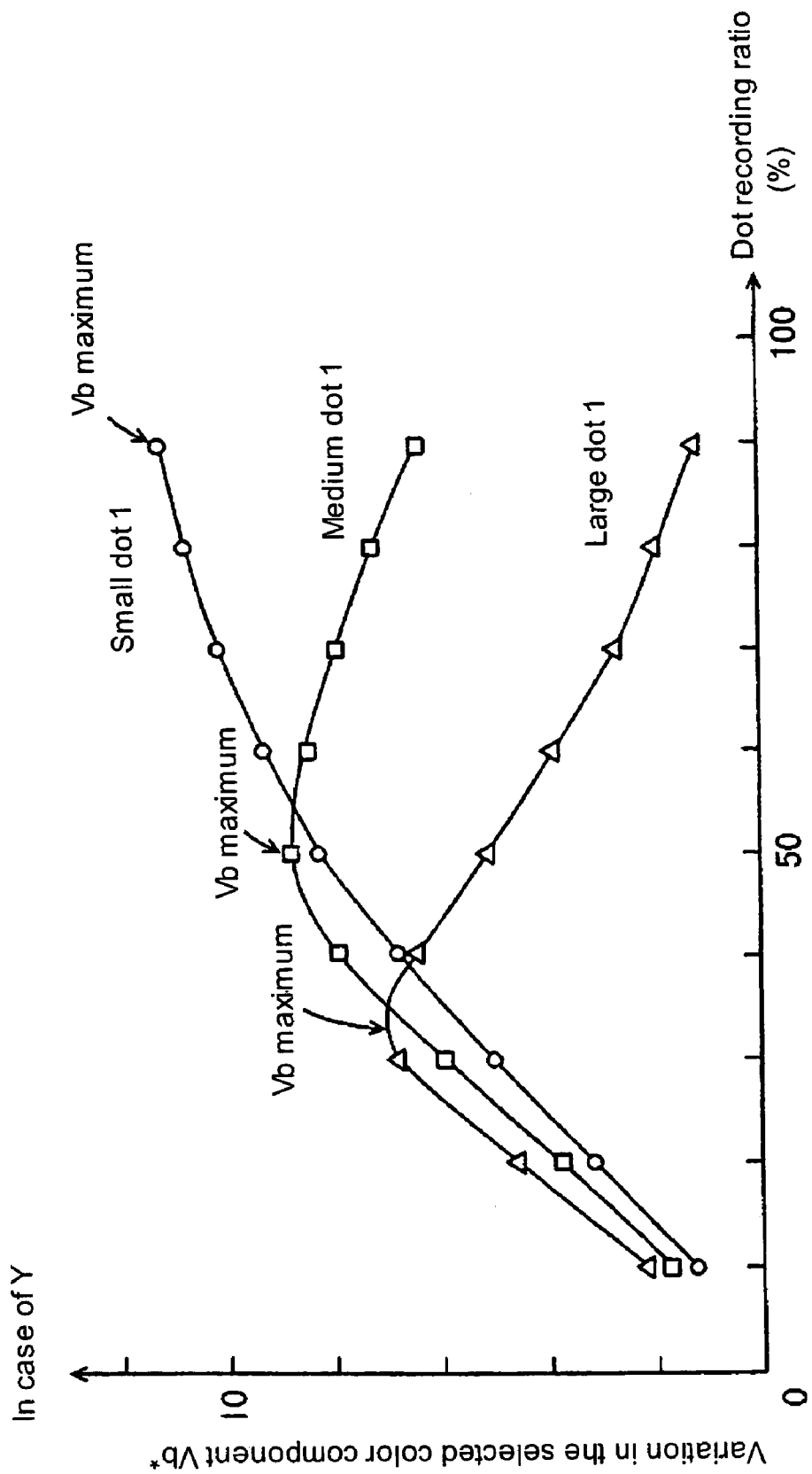
FIG. 13 is a graph showing an example of variations in the selected color components density relative to the dot recording ratio by the type of dot.

And FIG. 13 shows the variation in the measured color data due to variations in the amount of ink adhering on the printing paper for each type of ink. The figure shows an example of the result of seeking variations in the selected color component density value (amount b) between the patches P1 and P2 for which dot types and dot recording ratios are common by measuring the color in the color spaces Lab of the control patches P1 printed by the first control printer in nine stages between dot recording ratios of 10%-90% for each of large dot 1, medium dot 1 and small dot 1 of Y and the control patches P2 printed by the second control printer similarly in nine stages between dot recording ratios of 10%-90% for each of large dot 1, medium dot 1 and small dot 1. Incidentally, the first control printer and the second control printer are of the same type as the reference printer and the printer 20, and the first control printer is characterized by a larger amount of ink adhering on the printing medium as compared with the reference printer, and the second control printer is characterized by a smaller amount of ink adhering on the printing medium as compared with the reference printer.

The horizontal axis of the graph in FIG. 13 represents the dot recording ratio (in percent) while the vertical axis represents variations in amount b (Vb). As the graph clearly shows, generally the dot recording ratio for which variation in the selected color component density value Vb becomes maximum vis-à-vis the dot recording ratio of a color is the lower as the ink density of the dot type is larger.

Therefore, the computer 10 stores in advance the standard recording ratio table T1 in the HD 14, and creates the standard patch image data by referring the table T1, and makes the printer 20 print patches of the standard ink recording density according to the type of dot by reducing the dot recording ratio of the patches to be printed as the ink density of the dot is greater at the time of printing the reference color correcting patches P4, or the color correcting patches P7 or P8. Incidentally, the standard recording ratio table T1 is set for each ink color (for each printing head) and for each setting mode (setting mode of the dot size), and FIG. 12 shows an example of the setting mode 1 of Y (dischargeable mode of large dot 1, medium dot 1 and small dot 1).

Or, the computer 10 may actually seek a dot recording ratio whose variations Vb is the maximum for each combination of ink color and dot type based on the selected color component density value of the control patches P1 and the selected color component density value of the control patches P2. And each dot recording ratio thus acquired may be adopted as the standard ink recording density for each combination of ink color and dot type.

(4) Setting Process of Error Information in an After-Sales Service 2

Here, the combination between an ink unprintable due to the difficulty of the ink to adhere on the printing medium and the printing medium is included depending on the printing condition of the patch image adopted in the setting process of the color adjusting ID at the time of an after-sales service. In the present embodiment, we will describe the combination between the ink Mk and the glossy paper as an example of the combination between an ink that will be unprintable and the printing medium. As the ink Mk is characterized by the size of a drop of pigment contained in the ink being larger than other types of ink, its adhesion on the printing paper is weaker than other types of ink. Accordingly, if a smooth paper such as glossy paper is adopted as the printing paper, ink does not adhere well on the printing paper and it will be difficult to print images normally. However, in the setting process of ID at the time of an after-sales service, the combination between an unprintable ink as mentioned above and the printing paper may occur because of a narrow leeway in the selection of printing paper, the necessity of reducing the printing cost, unavailability of the jig mentioned above and other reasons. Therefore, the computer 10 solves such a problem by taking the following actions.

Figure 14:
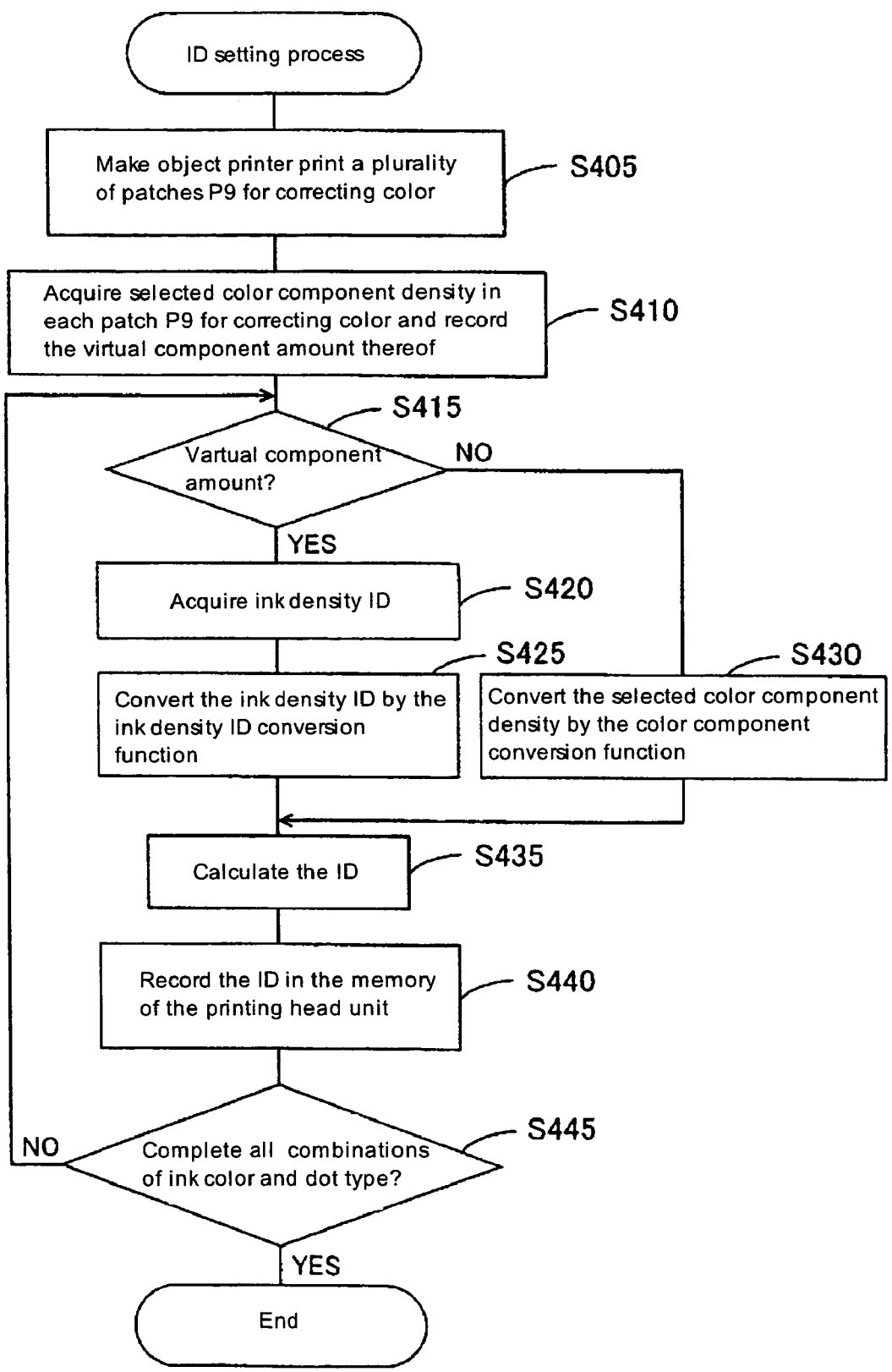
FIG. 14 is a flowchart showing another example of ID setting process at the time of after-sales service.

FIG. 14 is a flowchart showing the setting process of the color adjusting ID executed by the computer 10 at the time of an after-sales service, and shows an example different from FIG. 8.

In the ID setting process shown in the figure, patch images are printed under the printing condition 3 wherein a printing paper C (glossy paper) is adopted and each printing head discharges a type of ink primarily corresponding respectively thereto. However, as the ink Mk is unsuitable for printing on the printing paper C, actually the printing heads 29a-29d among the printing heads 29a-29e are used to discharge respectively the inks C, M, Y, and K. And the ink Mk is not loaded and the printing head 29e is not used.

In S405, the printer 20 for which the ID will be set remains connected with the computer 10, and the computer 10 controls the printer 20 to print a plurality of color correcting patches P9 in the standard ink recording density under the printing condition 3. As a result of such a process, patches 9 respectively colored in one of the colors C, M, Y, and K corresponding respectively to the combination of one of the printing heads 29a-29d and a dot type will be printed on the printing paper C. In other words, as patches will not be printed with the ink Mk, the rows of patches other than the row of patches at the right end will be printed on the printing paper C among the patches shown in FIG. 9.

In S410, the color of each color correcting patch P9 is measured by means of a colorimeter 40, and the selected color component density value is acquired from the measured color data of the patches P9. In other words, with regards to the patches respectively of the colors C, M, Y, and K actually printed, as in S310 shown in FIG. 8, the selected color component density value as the result of color measurement will be acquired. The colorimeter 40 measures the color of patches 9 in the specified order of patches such as C, M, Y, K of small dot 1, C, M, Y, K of medium dot 2 . . . and so forth. Therefore, at the time of acquiring the measured color data (selected color component density value) of patches P9 for each combination of ink type and dot type, the computer 10 inputs successively the measured color data outputted by the calorimeter 40 in a given order to record the same one to one at each address created for each combination of ink type and dot type in the specified recording area on the HD 14.

However, there is no patch image by the ink Mk for every dot type. As a result, in S410, the computer 10 processes at the same time to record the specified virtual component density at the address made available for recording the measured color data of each patch printed by the printing head 29e corresponding to the ink Mk. The relevant virtual component density is, for example, data indicating a specific value that may not be acquired by the color measurement of actual patch images.

In S415, the computer 10 reads one set of data related with the combination of an ink type and dot type from among the data recorded for every entire combinations of ink types and dot types in S410 (a set of selected color component density value and virtual component density), and judges whether the data that have been read are virtual component density or not.

If the data are virtual component density, it means that the measured color data of the patch printed by the combination of the ink type and the dot type related to that virtual component density do not exist. Therefore, the computer 10 acquires the ink density ID showing the degree of variation in the ink discharge amount inherent for the printing head (29e) corresponding to the ink type (ink Mk) (printing head variation data) (S420).

The following is an explanation on the ink density ID mentioned above. Generally, when various printing heads constituting a printing head unit 29 are made to discharge a same type of dot, the ink density per dot discharged show small variations among various printing heads. Accordingly, each printing head unit 29 that is a product of mass production has an ink density ID showing the extent of variation in the ink discharge amount for each printing head measured in advance at the time of production of the product specifically, if the amount of ink discharged when a certain type of dot is printed is equal to the amount of ink discharged serving as the basis of design of the same type of dot, the printing head is given an ink density ID=50. And if the amount of ink discharged when a certain type of dot is printed exceeds the amount of ink discharged serving as the design basis, the printing head is given an ink density ID in excess of 50 corresponding to that amount. On the contrary, when the amount of ink discharged when a certain type of dot is printed is less than the basis of design, the printing head is given an ink density ID below 50 corresponding to that amount.

The ink density ID thus measured in advance for each printing head constituting the printing head unit 29 is, for example, turned into a bar code (can be a two-dimensional bar code), and a seal on which the bar code is printed is pasted on each printing head unit 29. There, in the color adjusting ID setting process, such a bar code is read by a specified image reading device such as a scanner, and the reading result is stored in the HD 14 of the computer 10. As a result, in S420 the computer 10 can acquire the inherent ink density ID for the printing head 29e corresponding to the ink Mk.

In S425, the computer 10 converts the ink density ID acquired as mentioned above according to its value into the representative ink selected color component density value of a certain value by using an ink density ID conversion function g(x) convertible into a representative ink selected color component density value estimated to have been acquired if the patch (patch K) were printed by the printing head 29e corresponding to the ink Mk of the printer 20 under the printing condition 1 in the standard recording density at the time of an after-sales service.

We will explain on how to acquire the ink density ID conversion function. The ink density ID conversion function is also acquired in advance by experiment in the same way as the color component conversion function described above, and the ink density ID conversion function is stored in the HD 14.

In the first place, a printer 20 for calculating the ink density ID conversion function and a printer PT of the same type are prepared and the printer PT is connected with the specified computer (can be computer 10). And a plurality of printing heads having mutually different ink density ID from among various printing heads constituting the printer PT are used to print patch images for determining the ink density ID conversion function in the standard ink recording density respectively under the printing condition 1 by one dot type (for example, large dot 1). The standard ink recording density in this case means the standard ink recording density set for the combination of the ink Mk and one dot type mentioned above.

Figure 15:
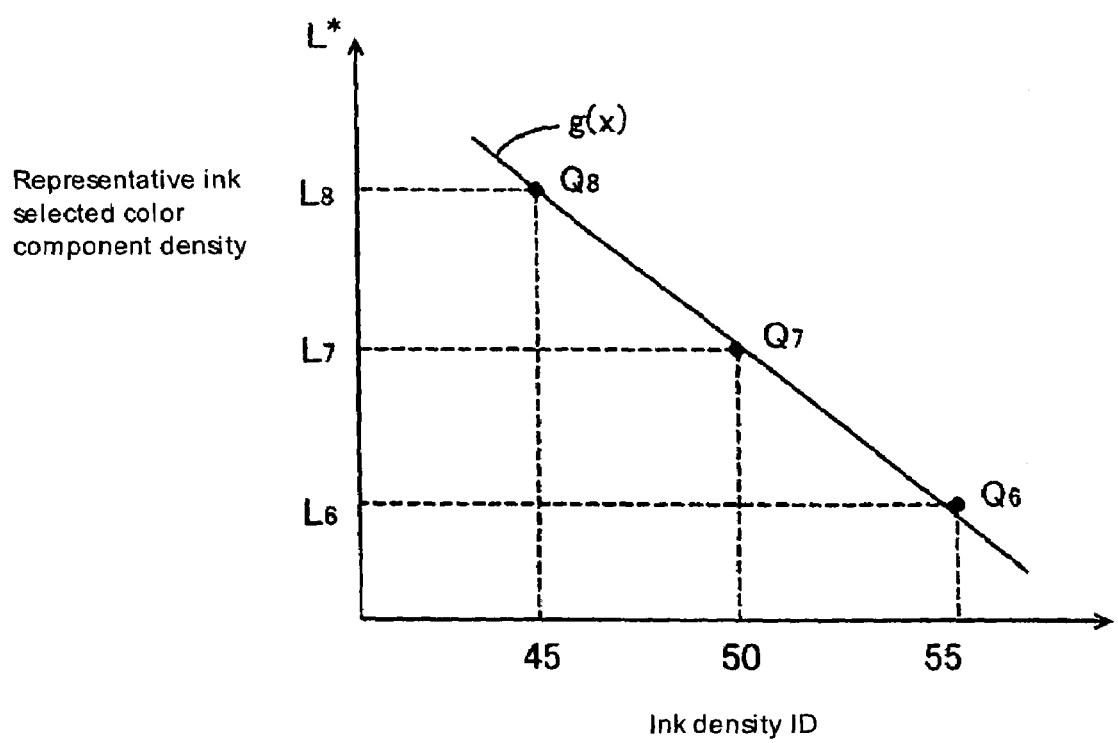
FIG. 15 is a table and graph showing the process of determining the ink amount ID conversion function.

The table in the upper section of FIG. 15 indicates the relationship of correspondence between the ink density ID of each printing head used for printing the patch images for determining the ink density ID conversion function and the representative ink selected color component acquired by the color measurement of each patch image. The figure shows the case of printing the patch images for determining the ink density ID conversion function by three printing heads whose ink density ID is respectively 45, 50 and 55 and measuring their color. The larger the ink density ID of the printing head is, the amount of ink discharged per dot increases, causing the density of a patch image printed thereby to rise. As a result, the voluminal relationship of each representative ink selected color component density value will be L8>L7>L6.

The graph in the lower section of FIG. 15 plots the relationship between each ink density ID and the representative ink selected component density shown in the upper section of the table above, and each plotted point is represented by Q6, Q7, and Q8. In the graph, the horizontal axis represents variations in the ink density ID, while the vertical axis represents the variation in the representative ink selected color component density acquired from the patches for determining the ink density ID conversion function. The computer determines an ink density ID conversion function $g(x)$ that takes such each point Q6-Q8 as a reference point and the ink density ID as a variable. In this case also, like the color component conversion function, the function may be a linear function passing through the position where the total sum of distances from each reference point will be the minimum, or may be a higher-order function passing through each reference point, or a higher-order function in the form of an approximation formula wherein the total sum of distances from each reference point will be the minimum.

The function $g(x)$ sought in the example described above can convert the ink density ID of the printing head corresponding to the ink Mk of the printer 20 to the representative ink selected color component density value estimated to have been acquired if patches were printed and their colors were measured by having the printing head corresponding thereto discharge one type of dot described above (large dot 1) under the printing condition 1. Incidentally, the ink density ID conversion function will be sought in advance for the number of the virtual component density mentioned above, or for all the dot types and will be recording in the HD 14.

The computer 10 acquires from time to time the ink density ID conversion function $g(x)$ relating to the dot type corresponding to the virtual component density read as mentioned above from the HD 14, and inputs the ink density ID conversion acquired in S420 to calculate the representative ink selected color component density value as a converted value.

On the other hand, if the data read in S415 are not virtual component density, the data read are selected color component acquired by the color measurement of the color correcting patches P9. Therefore, in S430, the selected color component density value is converted into the representative ink selected color component density value by the color component conversion function $f(x)$ corresponding thereto. Such a process is similar to that described in FIG. 8.

In S435, color adjusting ID are calculated by comparing the representative ink selected color component density value calculated in S425 or S430 with the reference values mentioned above, and in S440 the calculated color adjusting ID will be newly recording in the memory 31 of the printing head unit 29 of the printer 20. Such a processing is a processing similar to that shown in FIG. 8.

In S445, the computer judges whether color adjusting ID have been acquired corresponding to all the combinations of the ink type and the dot type, and in the case where there are combinations for which no ID have acquired, the processing subsequent S415 will be repeated. On the other hand, when the color adjusting ID corresponding to all the combinations have been acquired, the present process will be completed.

Thus, according to the embodiment shown in FIG. 14, even when there is a type of ink that does not adhere on the printing paper used and therefore is unprintable at the time of printing the color correcting patches P9 under the printing condition 3 for acquiring measured color data and calculating the color adjusting ID according to the measured color data because it has become necessary to set a color adjusting ID anew for the printer 20, it will be possible to calculate easily an ID of the equivalent value as the one that would have been calculated if the printing conditions adopted at the time of setting the ID in the past are available by using the ink amount ID given to the printing head corresponding to the unprintable type of ink, and the ink amount ID conversion function. Therefore, it is no longer necessary to take all the trouble for maintaining materials and equipment in a good and unified state for the setting of color adjusting ID at the production site of the product and places where after-sales services are rendered.

(5) Print Controlling Process

Figure 16:
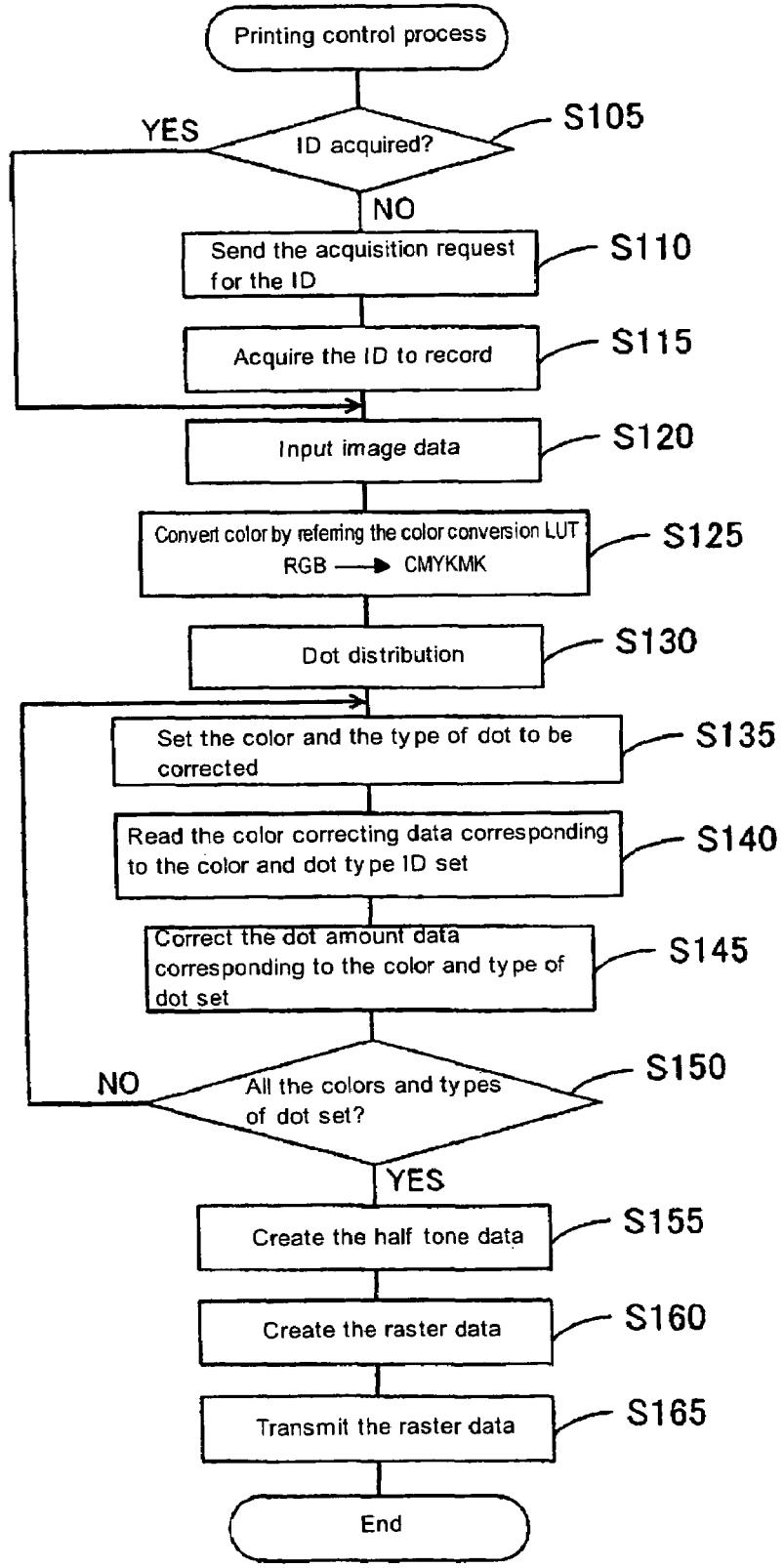
FIG. 16 is a flowchart showing the print controlling process.
Figure 17:
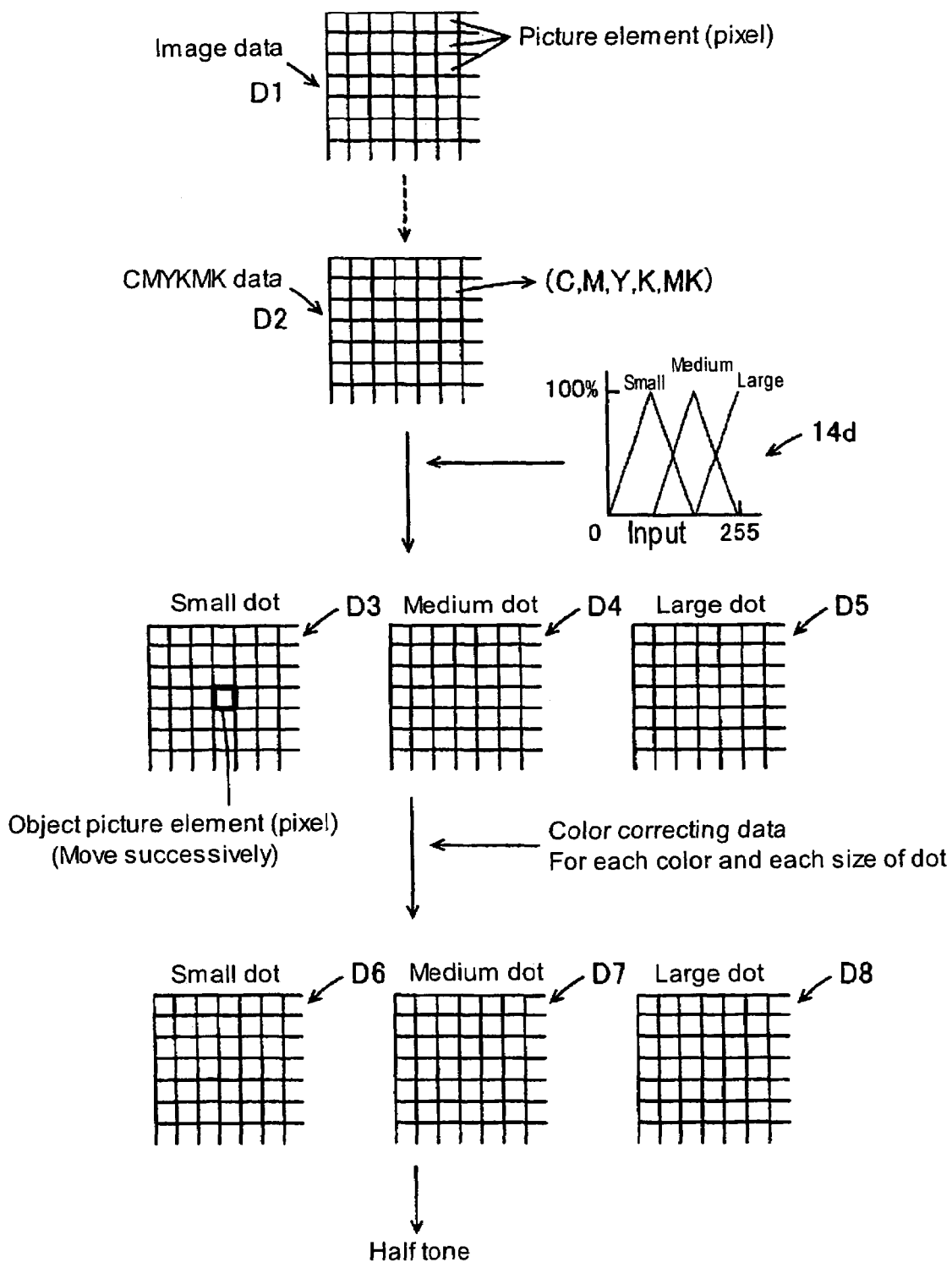
FIG. 17 is an illustration showing schematically the print controlling process.
Figure 18:
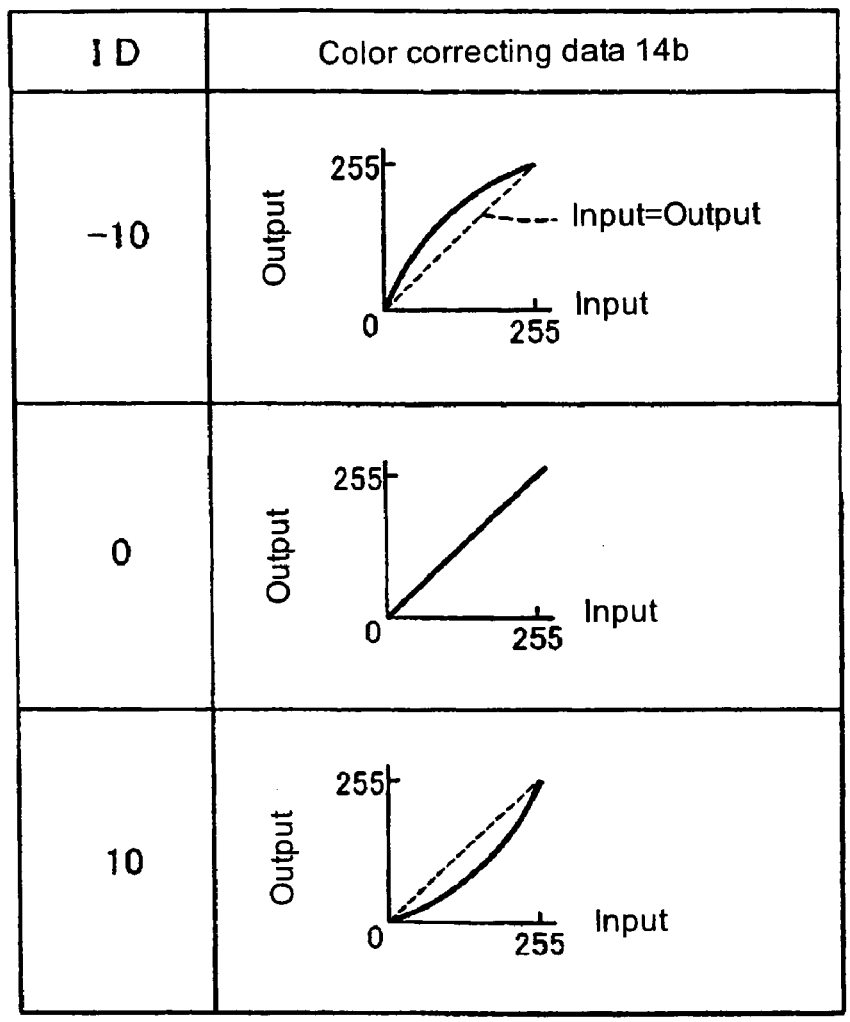
FIG. 18 is a graph and table showing schematically the features of color correcting data.

FIG. 16 is a flowchart showing the process of correcting the printing data by using the ID belonging to the printer 20 connected with the computer 10 and for controlling printing based on the corrected printing data. FIG. 17 is an illustration showing schematically the process. FIG. 18 is an illustration schematically showing the structure of a plurality of color correcting data 14b stored in the HD 14. In the following description, each of the printing heads 29a-29e of the printer 20 whose printing operation will be controlled is charged respectively with the type of ink primarily corresponding thereto of C, M, Y, K, and Mk.

The computer 10 judges whether an ID has been acquired from the printer 20 or not (S105). When the condition has been met, the computer 10 judges that it is no longer necessary to acquire an ID from the printer 20 and proceeds to S120.

When the condition has not been met, the computer prepares a acquisition request for a color adjusting ID and sends the same to the printer 20 (S110). Then, the printer 20 receives the acquisition request, reads the ID corresponding to all the combinations of ink color and dot type from the memory 31 of the printing head unit 29, and sends them to the computer 10. The computer 10 acquires all the ID and stores them in the HD 14 as ID 14a (S115). As the ID are thus integral with the printer 20. the user needs not input individually the ID corresponding to the printer even if he or she changes the printer and this is convenient.

In S120, the computer 10 inputs the image data D1 composed of gradation data corresponding to a plurality of separate element colors by a plurality of picture elements from the specified image inputting device, the HD 14 or the like, and converts them into RGB data in the wide area RGB color space expressed in gradation by a plurality of picture elements for each RGB. At this time, the data may be read partially or only pointers expressing buffer zones used in the delivery of data may be delivered. The image data D1 to be inputted are data expressing an image in gradation data for every plurality of picture elements in the matrix form, and they may take a form of image data composed of RGB defined in the sRGB color space, or image data composed of YUV in the YUV table color system. Of course, they may be data conform to the Exif2 standard (Exif is a registered trademark of the Electric Information Technology Industrial Association), data based on Print Image Matching (PIM-PIM is a registered trademark of Seiko Epson Corp.) and the like. Since each component of image data consists of a variety of number of gradations, image data are converted into RGB data of each RGB having 256 gradations in a wide area RGB color space according to the definition of sRGB or YUV table color system and the like. The RGB data are printing data expressed by a plurality of element colors RGB.

Then, the computer 10 converts the RGB data by referring the color conversion LUT into the CMYKMk data consisting of gradation data corresponding to the amount of each of the inks CMYKMk used while shifting successively each picture element of the gradation data to be converted composing the RGB data (S125). The color conversion LUT is an information table defining the relationship of correspondence between the RGB data and the CMYKMk data expressing the gradation of image by the same number of picture elements for each CMYKMk regarding a plurality of reference points. When no CMYKMk data matching the RGB data inputted are stored in the color conversion LUT, the computer 10 acquires the CMYKMk data corresponding to a plurality of RGB data close to the RGB data inputted, and converts them into the CMYKMk data corresponding to the RGB data by an interpolating calculation such as volume interpolation. The CMYKMk data D2 are, like the RGB data, printing data expressing images by gradation data for every plurality of picture elements in the dot matrix form, and are data having 256 gradations for each CMYKMk expressing the amount of each ink discharged respectively by the printer 20 from each printing head 29a-29e.

Then, the computer 10 carries out the dot distribution process for converting the gradation data (input gradation data) for each color CMYKMk constituting the CMYKMk data D2 into dot density data (output gradation data) expressing a plurality of types of dot formation amount of different ink density for each same type (S130) by referring the dot distribution table 14d while shifting successively the picture element of the gradation data to be converted composing the CMYKMk data D2. In the present embodiment, ID14a are used to correct these dot density data (printing data) and to compensate color drifts.

As shown in the upper section of FIG. 19, the dot distribution table 14d is an information table defining the correspondence relationship between the input gradation data showing the amount of ink used by the printer 20 and the output gradation data showing the amount of dot formed by the type of dot. The table 14d is created by each color, stores the output gradation value showing the amount of dot formed in each gradation of the input gradation value by the type of dot. In FIG. 17, the horizontal axis represents the input gradation value and the vertical axis represents the relative value of the output gradation value, and shows schematically the dot density data of each small, medium and large dot relative to the input gradation value. The present embodiment adopts three types for the mode of setting the size of dot. Therefore, in conformity with each setting mode 1-3, the dot distribution table 14d stores the output gradation data D11 that will be referred when the small dot 1, the medium dot 1 and the large dot 1 are formed, the output gradation data D12 that will be referred when the small dot 2, medium dot 2 and large dot 2 are formed, and the output gradation data D13 that will be referred when the small dot 3, medium dot 3 and large dot 3 are formed.

In the dot distribution process, the gradation data constituting the CMYKMk data D2 are distributed into a plurality of types of dot used corresponding to any one of the setting mode 1-3 by referring the dot distribution table mentioned above, and the dot density data D3 for small dot, the dot density data D4 for medium dot and the dot density data D5 for large dot are created as shown in FIG. 17. These dot density data D3-D5 are data expressing each image by the gradation data for each picture element in the dot matrix form in the same way as CMYKMk data D2 and are data having 256 gradations for each CMYKMk showing the amount of ink used for each dot discharged by the printing heads of the printer 20.

However, it is possible that delicate errors may have occurred in the color of images printed on the printing medium even if the dot density data are used at this stage to make the printer 20 to print. This is due to drifts in the weight of ink discharged from each array of printing nozzles, a delicate variation in the voltage given to the printing heads when the printing heads were fixed to the printer and the like. And it is possible that the dots formed on the printing medium may crack and fail to become quasi circular due to this variation in voltage or the condition of fixing the printing heads, and as a result, a delicate variation may appear in the color of printed images. Therefore, the dot density data are corrected to compensate such variations in color.

After having created various dot density data, the computer 10 sets the ink colors and dot types for which the dot density data are to be corrected (S135). For example, it is enough to set the combination of ink colors and dot types for which the dot density data are to be corrected from among all the combinations first by making different values correspond for each combination of each ink color and each dot type, and by renewing successively the value of pointers in which the relevant values will be stored.

Here, we will explain on the color correcting data 14b for correcting the dot density data.

As shown in FIG. 18, each color correcting data 14b are correlated with the specified ID value and are stored in the HD14. As shown in the lower section of the figure, the color correcting data 14b are shown in the information table defining the relationship of correspondence between the input gradation value Ai (i is an integer between zero and 255) and the output gradation value with regards to each gradation (all the gradations) of the input gradation value Ai. The output gradation values ACi relative to the input gradation values Ai are defined as shown by the solid lines in the upper section of the figure.

Then, the computer 10 reads from the HD14 the ID14a corresponding to the combinations of the ink colors and dot types set, specifies the color correcting data corresponding to the value of the ID14a from among a plurality of color correcting data 14b stored in the HD14, and reads the color correcting data (S140). And the computer 10 corrects the dot density data of the object picture elements and creates the corrected dot density data D6-D8 by referring the color correcting data that had been read in S140 while shifting successively the object picture elements by choosing the gradation data of various picture elements constituting the dot density data corresponding to the combination of the ink color and dot type set as the object of conversion (S145).

When the ID corresponding to a combination of the ink color and dot type is determined as having a negative value, the brightness of color on the printing medium is lower than on the reference printer, when the printer 20 is made to discharge ink by the combination. (However, in the case of calculating ID based on the magnitude of the amount L as in the present embodiment, when the ID has a positive value, the brightness of color is inferior to the reference printer.) Therefore, in order to improve the brightness of color as shown in FIG. 18, the color correcting data are set as a general trend in such a way that the output gradation values may be higher than the input gradation values. Therefore, the dot density data relating to the combination of ink color and dot type whose ID has a negative value (positive value) have as a general trend their gradation values substantially corrected by referring such color correcting data. On the other hand, when the ID is determined to have a positive value, the printer 20 develops a brighter color on the printing medium than the reference printer. (However, when the ID is calculated on the basis of the magnitude of the amount L as in the present embodiment, the printer 20 develops a brighter color than the reference printer when the ID has a negative value). Therefore, as shown in the figure, the color correcting data have as the general trend lower output gradation values than the input gradation values in order to reduce the brightness of color of the printed image. Therefore, the dot density data related to the combination of ink color and dot type whose ID have a positive value (a negative value) have, as a general trend, their gradation value corrected lower by referring such color correcting value. In this way, it is possible to compensate the color of the printer 20 having printed the color correcting patches P8 or P9. Incidentally, the degree of correction by means of color correcting data as to what extent the output gradation value may be made raised or lowered from the input gradation value may be set in advance depending on the magnitude of the ID value.

Then, the computer 10 judges whether all the combinations of each ink color and each dot type have been set or not (S150) and when the condition has not been met, the computer 10 repeats the steps S135-S150, and when the condition has been met, the computer proceeds to S155.

In S155, the half-tone processing unit executes the specified half-tone processing including error diffusion method, dither method, density pattern method and the like for dot density data for each size of dot, to create half-tone data for each CMYKMk consisting of the same number of picture elements as those of the CMYKMk data. The half-tone data are data indicating the state of dot formation by the presence of dot or not, and can be indicated in the form of two-gradation binary data rendered binary according to the presence of dot represented by the gradation value of "1" and the absence of dot represented by the gradation value of "0". Obviously, four gradation data and the like may be adopted.

And the computer 10 executes the specified processing of rasterization on the half-tone data created by the rasterization processing unit, rearranges them in the order used by the printer, creates raster data for each CMYKMk (S160), outputs the same to the printer 20 (S155) and completes the process. Then, the printer 20 acquires raster data expressing images, drives the printing heads based on these data, discharges ink to make the ink adhere on the printing paper, and forms printed images corresponding to the RGB data. Since the raster data are data wherein color drifts are compensated by each CMYKMk, the printed images will be images whose color drifts are compensated.

Incidentally, the printing data to be corrected that the time of color compensation can take the form of half-tone data, raster data and the like in addition to the dot density data described above. In the case of these data, it is possible to compensate the color of the printed images by adjusting the number of dots formed on the printing medium by a percentage corresponding to the value of ID. And as shown in the lower section of FIG. 19, the gradation values themselves on the output side defined in the dot distribution table 14d for every whole combination of each ink color and each dot type may be corrected by the color correcting data corresponding to each ID, and the dot distribution table 14d may be rewritten by the corrected output gradation values. And if the size of dots used is limited to one, it is possible to turn the CMYKMk data D2 immediately after color conversion into printing data to be corrected. In the case of the CMKMk data D2, like the correction of the dot density data mentioned above, it is possible to compensate the color of the printed image by correcting by referring the color correcting data corresponding to the ID value. Obviously, even in the case of RGB data before a color conversion, it is possible to compensate the color of printed images by acquiring a color correcting LUT defining the correspondence relationship between RGB data before correction and corrected RGB data and correlating it with various values of the ID, and by correcting the RGB data by referring the color correcting LUT corresponding to the ID values.

Thus, according to the present invention, the color of the printer 20 is compensated based on the color adjusting ID indicating the result of comparing the converted values by the color component conversion function of the measured color data of the color correcting patches P8 actually printed by the printer 20 under the printing condition 2 or of the measured color data of the color correcting patches P9 printed by the printer 20 under the printing condition 3, with the reference value acquired from the patches P4 printed by the reference printer under the printing condition 1. Therefore, delicate errors in the color of printed images due to a delicate variation in voltage applied to the printing heads and the like do not occur as in the past when only variation in the weight of ink in individual printing head was compensated. Therefore, the color reproducibility of printed images vis-à-vis the reference color improves as compared with the past when only the above-mentioned weight of ink was compensated.

In addition, as the printing data are corrected according to the value of ID indicating the result of comparing the converted values of only selected color components having the maximum variation relative to the variation of ink recording density among the color component density constituting the colored data and the reference value, the color of printing data is corrected with a high precision. At the same time, as the converted values of only selected color component density values having the maximum variation vis-à-vis the variation of ink recording density values are used to calculate the ID, complicated calculations are unnecessary at the time of calculating the ID. Therefore, it becomes possible to accelerate the whole calibration operation.

The above-mentioned ID shows the result of comparing the converted values of the selected color component density of patch images printed by the standard ink recording density whose variation in the selected color component density due to variations in the amount of ink adhering on the printing medium is large or becomes the maximum and the representative ink selected color component density value of patch images printed by the reference printer in the ink recording density for every combination between ink type and dot type, the ID reflect with a high precision the extent of color drifts for every combination of ink type and dot type in the printer 20. Therefore, it is now more certain that the color reproducibility of the printed images vis-à-vis the reference color will be obtained by the color compensation using the ID. And it becomes possible to accelerate the whole calibration work by using the selected color component density values of only patches of the standard ink recording density value whose variation is large or becomes the maximum.

The foregoing invention has been described in terms of preferred embodiments. However, those skilled, in the art will recognize that many variations of such embodiments exist. Such variations are intended to be within the scope of the present invention and the appended claims.

I claim:

1. A method for acquiring error information indicating color drifts on a printing device having a plurality of printing heads corresponding to a plurality of types of ink and capable of printing images corresponding to printing data by making ink adhere on a printing medium, comprising the steps of:
   in the case where the error information is expressed by a result of comparing a first measured color data acquired by measuring in a specified color space a color of patch images printed by the printing device under a first printing condition in a standard ink recording density and a reference measured color data,
   acquiring a second measured color data by measuring in a specified color space a color of patch images printed by the printing device under a second printing condition different from the first printing condition in the standard ink recording density;
   converting the second measured color data acquired into estimated measured color data estimated to be acquired if the printing device is made to print patch images under the first printing condition and in the standard ink recording density and the color of these patch images are measured in a specified color space; and
   comparing the estimated measured color data and the reference measured color data.

2. The method according to claim 1, wherein:
   the specified printing device is controlled to print patch images under the first printing condition in the standard ink recording density while an ink amount of dots discharged from the printing head remains changed by a specified extent from a specified reference amount, and measured color data having the same color component as the first measured color data obtained by measuring the color of the patch images are obtained;
   the specified printing device is controlled to print patch images under the second printing condition in the standard ink recording density while the ink amount of dots discharged from the printing head remains changed by a specified extent from the specified reference amount, and measured color data having the same color component as the second measured color data obtained by measuring the color of the patch images are obtained;
   these two measured color data are compared, and a function for which the second measured color data is an input value is determined in advance by taking their relationship of correspondence into account, the function being used for converting the second measured color data into the estimated measured color data.

3. The method according to claim 2, wherein
   the first printing condition and the second printing condition are different in the type of ink charged in each printing head for printing patch images.

4. The method according to claim 1, wherein
   the reference measured color data are acquired by measuring the color in the specified color space of the patch images printed by the specified reference printing device under the first printing condition in the standard ink recording density.

5. The method according to claim 4, wherein
   the first printing condition and the second printing condition are different in the type of ink charged in each printing head for printing patch images.

6. The method according to claim 1, wherein
   the first printing condition and the second printing condition are different in the type of ink charged in each printing head for printing patch images.

7. The method according to claim 1, wherein
   the first printing condition and the second printing condition are different in the type of printing medium used for printing patch images.

8. A method for acquiring error information indicating color drifts on a printing device having a plurality of printing heads corresponding to a plurality of types of ink and capable of printing images corresponding to printing data by making ink adhere on a printing medium, comprising the steps of:
   in the case where the error information is expressed by a result of comparing a first measured color data acquired by measuring in a specified color space a color of patch images printed by the printing device under a first printing condition in a standard ink recording density and a reference measured color data,
   acquiring printing head variation data showing an extent of variation in an amount of ink discharged related to the printing head corresponding to a non-adhering type of ink, when there is a type of ink not adhering on the printing medium used for printing patch images by the printing device under a second printing condition different from the first printing condition in the standard ink recording density,
   seeking estimated measured color data estimated to be acquired if the color of the patch images printed by the printing head corresponding to the non-adhering type of ink under the first printing condition in the standard ink recording density were measured in the specified color space based on the printing head variation data of the printing head corresponding to the non-adhering type of ink, and comparing the estimated measured color data and the reference measured color data.

9. The method according to claim 8, wherein
the printing device is provided in advance with printing head variation data relating to each printing head in an information form readable by the specified image reading device,
the printing head variation data related to the printing head corresponding to the non-adhering type of ink are inputted from the image reading device by having the image reading device read the printing head variation data.

10. The method according to claim 9, wherein
the first printing condition and the second printing condition are different in the type of ink charged in each printing head for printing patch images.

11. The method according to claim 8, further comprising the steps of:
determining a function for which the printing head variation data is an input value in advance by referring the relationship of correspondence between each measured color data of the same color component as the first measured color data and the printing head variation data related to a plurality of printing heads having the variation, the measured color data being acquired from the result of color measurement in the specified color space of the patch images printed respectively under the first printing condition in the standard ink recording density by using a plurality of printing heads respectively having variations in the amount of ink discharged in the prescribed printing device; and
converting the printing head variation data related with the printing head corresponding to the non-adhering type of ink by using the function thereby to obtain the estimated measured color data.

12. The method according to claim 11, wherein
the first printing condition and the second printing condition are different in the type of ink charged in each printing head for printing patch images.

13. The method according to claim 8, wherein
the first printing condition and the second printing condition are different in the type of ink charged in each printing head for printing patch images.

14. A program product for making a computer execute a process of acquiring error information expressing color drifts in a printing device having a plurality of printing heads corresponding to a plurality of ink types and capable of printing images corresponding to printing data by having ink adhere on a printing medium, comprising the functional code of making the computer execute the processes of:
in the case where the error information is expressed by a result of comparing a first measured color data acquired by measuring in a specified color space a color of patch images printed by the printing device under a first printing condition in a standard ink recording density and a reference measured color data,
acquiring a second measured color data by measuring in a specified color space a color of patch images printed by the printing device under a second printing condition different from the first printing condition in the standard ink recording density;
converting the second measured color data acquired as described above into estimated measured color data estimated to be acquired if the printing device is made to print patch images under the first printing condition and in the standard ink recording density and the color of the patch images are measured in a specified color space; and
acquiring the error information by comparing the estimated measured color data and the reference measured color data.

15. A device for acquiring error information expressing color drifts in a printing device having a plurality of printing heads corresponding to a plurality of types of ink and capable of printing images corresponding to printing data by having ink adhere on a printing medium, comprising
on the premise that the error information is expressed by a result of comparing a first measured color data acquired by measuring in a specified color space a color of patch images printed by the printing device under a first printing condition in a standard ink recording density and a reference measured color data,
a measured color data acquisition unit for acquiring a second measured color data by measuring in a specified color space a color of the patch images printed by the printing device under a second printing condition different from the first printing condition in the standard ink recording density;
a measured color data conversion unit for converting the second measured color data acquired into estimated measured color data estimated to be acquired if the printing device is made to print patch images under the first printing condition and in the standard ink recording density and the color of these image patches is measured in a specified color space; and
an error information generation unit for acquiring error information by comparing the estimated measured color data and the reference measured color data.

16. A method for controlling printing of printing devices having a plurality of printing heads corresponding to a plurality of ink types and capable of printing images corresponding to printing data by making ink adhere on a printing medium, comprising the steps of:
on the premise that the error information is expressed by a result of comparing a first measured color data acquired by measuring in a specified color space a color of patch images printed by the printing device under a first printing condition in a standard ink recording density and a reference measured color data,
acquiring a second measured color data by measuring in a specified color space a color of patch images printed by the printing device under a second printing condition different from the first printing condition in the standard ink recording density;
converting the second measured color data acquired into estimated measured color data estimated to be acquired if the printing device is controlled to print patch images under the first printing condition and in the standard ink recording density and the color of these patch images is measured in a specified color space;
acquiring error information by comparing the estimated measured color data and the reference measured color data;
determining color correcting data for compensating drifts in the ink amount in the printing device depending on the value of the error information;
correcting printing data for compensating the color drifts in the images printed by the printing devices from the printing data expressing the images by using the color correcting data; and
controlling the printing devices to print the printing images corresponding to the corrected printing data.

17. A program product for making the computer execute a process of controlling a printing device having a plurality of printing heads corresponding to a plurality of ink types and capable of printing images corresponding to the printing data to print by having ink adhere on a printing medium, comprising the functional code of making the computer execute the processes of;

in the case where the error information is expressed by the result of comparing the first measured color data acquired by measuring in the specified color space the color of patch images printed by the printing device under the first printing condition in the standard ink recording density and the reference measured color data, acquiring a second measured color data by measuring in a specified color space a color of patch images printed by the printing device under a second printing condition different from the first printing condition in the standard ink recording density;

converting the second measured color data acquired into estimated measured color data estimated to be acquired if the printing device is controlled to print patch images under the first printing condition and in the standard ink recording density and the color of these patch images are measured in a specified color space;

acquiring error information by comparing the estimated measured color data and the reference measured color data;

determining color correcting data for compensating drifts in the ink amount in the printing device according to the value of the error information;

correcting printing data for compensating the color drifts in the printed images printed by the printing devices from the printing data expressing the images by using the color correcting data; and controlling the printing devices to print the printing images corresponding to the corrected printing data.

18. A device for controlling the printing device having a plurality of printing heads corresponding to a plurality of ink types and capable of printing images corresponding to the printing data to print by having ink adhere on the printing medium, comprising:

on the premise that the error information is expressed by a result of comparing a first measured color data acquired by measuring in a specified color space a color of patch images printed by the printing device under a first printing condition in a standard ink recording density and a reference measured color data, a measured color data acquisition unit for acquiring a second measured color data by measuring in a specified color space a color of the patch images printed by the printing device under a second printing condition different from the first printing condition in the standard ink recording density;

a measured color data conversion unit for converting the second measured color data acquired into estimated measured color data estimated to be acquired if the printing device is controlled to print patch images under the first printing condition and in the standard ink recording density and the color of these patch images is measured in a specified color space;

an error information generation unit for acquiring error information by comparing the estimated measured color data and the reference measured color data;

a color correcting data determining unit for determining color correcting data for compensating drifts in the ink amount in the printing device according to the value of the error information; and a print controlling unit for correcting the printing data expressing images to the printing data for compensating color drifts in printed images printed by the printing device corresponding to the corrected printing data by using the color correcting data, and for controlling the printing device to print images for printing corresponding to the corrected printing data.

19. A program product for making a computer execute a process of acquiring error information expressing color drifts in a printing device having a plurality of printing heads corresponding to a plurality of types of ink and capable of printing images corresponding to printing data by having ink adhere on a printing medium, comprising the functional code of making the computer to execute the processes of:

in the case where the error information is expressed by a result of comparing a first measured color data acquired by measuring in a specified color space a color of patch images printed by the printing device under a first printing condition in a standard ink recording density and a reference measured color data, acquiring a printing head variation data indicating an extent of variation in an amount of ink discharged related to the printing head corresponding to a non-adhering ink used, if there is any ink not adhering on the printing medium used for making the printing device print patch images under the second printing condition different from the first printing condition in the standard ink recording density;

seeking the estimated measured color data estimated to be acquired if the color of the patch images printed by the printing head corresponding to the non-adhering type of ink under the first printing condition in the standard ink recording density were measured in the specified color space based on the printing head variation data of the printing head corresponding to a the non-adhering type of ink; and acquiring error information by comparing the estimated measured color data sought and the reference measured color data.

20. A device for acquiring error information expressing color drifts in a printing device having a plurality of printing heads corresponding to a plurality of types of ink and capable of printing images corresponding to printing data by having ink adhere on the printing medium, comprising on the premise that the error information is expressed by a result of comparing a first measured color data acquired by measuring in a specified color space a color of patch images printed by the printing device under a first printing condition in a standard ink recording density and a reference measured color data, a variation data acquisition unit for acquiring a printing head variation data showing an extent of variation in a discharged amount of ink related to the printing head corresponding to the non-adhering type of ink, if there is any ink not adhering on the printing medium used for making the printing device print patch images under a second printing condition different from the first printing condition in the standard ink recording density;

an estimated measured color data calculating unit for calculating estimated measured color data estimated to be acquired if the color of the patch images printed by the printing head corresponding to the non-adhering ink under the first printing condition in the standard ink recording density were measured in the specified color space based on the printing head variation data of the printing head corresponding to the non-adhering ink type; and an error information generation unit for acquiring error information by comparing the estimated measured color data sought and the reference measured color data.

21. A method for controlling printing of printing devices having a plurality of printing heads corresponding to a plurality of ink types and capable of printing images corresponding to printing data by making ink adhere on a printing medium, comprising the steps of;

in the case where the error information is expressed by a result of comparing a first measured color data acquired by measuring in a specified color space a color of patch images printed by the printing device under a first printing condition in a standard ink recording density and a reference measured color data, acquiring a printing head variation data showing an extent of variation in a discharged amount of ink related to the printing head corresponding to a non-adhering type of ink, if there is any ink not adhering on the printing medium used for making the printing device print patch images under a second printing condition different from the first printing condition in the standard ink recording density;

calculating estimated measured color data estimated to be acquired if the color of the patch images printed by the printing head corresponding to the non-adhering type of ink under the first printing condition in the standard ink recording density were measured in the specified color space based on the printing head variation data of the printing head corresponding to the non-adhering type of ink;

acquiring error information by comparing the estimated measured color data sought and the reference measured color data;

determining color correcting data for compensating drifts in the ink amount in the printing device according to the value of the error information;

correcting printing data for compensating the color drifts in the printed images printed by the printing devices from the printing data expressing the images by using the color correcting data; and controlling the printing devices to print the printing images corresponding to the corrected printing data.

22. A program product for making a computer execute a process of controlling a printing device having a plurality of printing heads corresponding to a plurality of ink types and capable of printing images corresponding to printing data to print by having ink adhere on a printing medium, comprising the functional code of making the computer execute the processes of:

in the case where error information is expressed by a result of comparing a first measured color data acquired by measuring in a specified color space a color of patch images printed by the printing device under a first printing condition in a standard ink recording density and a reference measured color data, acquiring printing head variation data showing an extent of variation in a discharged amount of ink related to the printing head corresponding to a non-adhering type of ink, if there is any ink not adhering on the printing medium used for making the printing device print patch images under a second printing condition different from the first printing condition in the standard ink recording density;

calculating estimated measured color data estimated to be acquired if the color of the patch images printed by the printing head corresponding to the non-adhering type of ink under the first printing condition in the standard ink recording density were measured in the specified color space based on the printing head variation data of the printing head corresponding to the non-adhering type of ink;

acquiring error information by comparing the estimated measured color data and the reference recorded color data;

determining the color correcting data for compensating drifts in the ink amount in the printing device according to the value of the error information;

correcting printing data for compensating the color drifts in the printed images printed by the printing devices based on the printing data expressing the images by using the color correcting data; and controlling the printing devices to print the printing images corresponding to the corrected printing data.

23. A device for controlling a printing device having a plurality of printing heads corresponding to a plurality of ink types and capable of printing images corresponding to printing data to print by having ink adhere on a printing medium, comprising:

on the premise that the error information is expressed by a result of comparing a first measured color data acquired by measuring in a specified color space a color of patch images printed by the printing device under a first printing condition in a standard ink recording density and a reference measured color data;

a variation data acquiring unit for acquiring printing head variation data showing an extent of variation in a discharged amount of ink related to the printing head corresponding to a non-adhering type of ink, if there is any ink not adhering on the printing medium used for making the printing device print patch images under the second printing condition different from the first printing condition in the standard ink recording density;

an estimated measured color data calculating unit for calculating estimated measured color data estimated to be acquired if the color of the patch images printed by the printing head corresponding to the non-adhering ink under the first printing condition in the standard ink recording density were measured in the specified color space based on the printing head variation data of the printing head corresponding to the non-adhering type of ink;

an error information generation unit for determining color correcting data for acquiring error information by comparing the estimated measured color data sought and the reference measured color data;

a color correcting data determining unit for determining color correcting data for compensating drifts in the ink amount in the printing device according to the value of the error information; and a print controlling unit for correcting the printing data expressing images to the printing data for compensating color drifts in printed images printed corresponding to the corrected printing data by using the color correcting data, and for controlling the printing device to print printed images corresponding to the corrected printing data.

* * * * *